(12) United States Patent
Luo et al.

(10) Patent No.: US 10,892,850 B2
(45) Date of Patent: Jan. 12, 2021

(54) METHOD AND APPARATUS FOR CARRYING IDENTIFICATION INFORMATION

(71) Applicant: HUAWEI TECHNOLOGIES CO., LTD., Guangdong (CN)

(72) Inventors: Hejia Luo, Hangzhou (CN); Yue Zhou, Hangzhou (CN); Rong Li, Hangzhou (CN); Ying Chen, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 23 days.

(21) Appl. No.: 16/265,224

(22) Filed: Feb. 1, 2019

(65) Prior Publication Data
US 2019/0181980 A1    Jun. 13, 2019

Related U.S. Application Data

(63) Continuation of application No. PCT/CN2017/095459, filed on Aug. 1, 2017.

(30) Foreign Application Priority Data

Aug. 10, 2016  (CN) .......................... 2016 1 0652304
Jun. 30, 2017  (WO) ................. PCT/CN2017/091167

(51) Int. Cl.
*H04L 1/00* (2006.01)
*H04W 72/04* (2009.01)

(52) U.S. Cl.
CPC .......... *H04L 1/0058* (2013.01); *H04L 1/0041* (2013.01); *H04L 1/0057* (2013.01); *H04L 1/0061* (2013.01); *H04W 72/042* (2013.01)

(58) Field of Classification Search
CPC ... H04L 1/0058; H04L 1/0057; H04L 1/0061; H04L 1/0041; H04W 72/042
See application file for complete search history.

(56) References Cited

U.S. PATENT DOCUMENTS

2003/0224719 A1  12/2003  Lucidarme et al.
2014/0376461 A1  12/2014  Park et al.
(Continued)

FOREIGN PATENT DOCUMENTS

CN    101141788 A    3/2008
CN    101400069 A    4/2009
(Continued)

OTHER PUBLICATIONS

P. Trifonov and V. Miloslayskaya, "Polar codes with dynamic frozen symbols and their decoding by directed search," 2013 IEEE Information Theory Workshop (ITW), Sevilla, 2013, pp. 1-5. (Year: 2013).*

(Continued)

*Primary Examiner* — Cynthia Britt
(74) *Attorney, Agent, or Firm* — Womble Bond Dickinson (US) LLP

(57) ABSTRACT

A method and an apparatus for carrying identification information are disclosed, to extend a quantity of bit positions that can represent identification information. The method includes determining, by a base station, bit locations that can be used to carry identification information in to-be-coded bits, where the bit locations that can be used to carry the identification information include locations of fixed bits, the identification information is used to identify a terminal, and the fixed bits are used by the terminal to perform error correction in a decoding process, adding, by the base station, the identification information to the bit locations, and encoding, by the base station in a polar code encoding mode, the to-be-coded bits that carry the identification information, and sending an encoded polar code to the terminal.

20 Claims, 14 Drawing Sheets

(56) References Cited

U.S. PATENT DOCUMENTS

| | | | |
|---|---|---|---|
| 2015/0092886 A1 | 4/2015 | Ionita et al. | |
| 2015/0333775 A1* | 11/2015 | Korb | H03M 13/13 714/780 |
| 2016/0013810 A1 | 1/2016 | Gross et al. | |
| 2016/0182187 A1 | 6/2016 | Kim et al. | |
| 2017/0019214 A1* | 1/2017 | Shen | H04L 1/0067 |
| 2018/0241414 A1* | 8/2018 | Gresset | H03M 13/1102 |
| 2018/0351579 A1* | 12/2018 | Hong | H03M 13/13 |

FOREIGN PATENT DOCUMENTS

| | | |
|---|---|---|
| CN | 103220076 A | 7/2013 |
| CN | 103490847 A | 1/2014 |
| CN | 108432165 A | 8/2018 |
| EP | 1367850 B1 | 1/2013 |
| JP | 2004328035 A | 11/2004 |
| WO | 2017/106246 A2 | 6/2017 |

OTHER PUBLICATIONS

Z. Wu and B. Lankl, "Polar Codes for Low-Complexity Forward Error Correction in Optical Access Networks," Photonic Networks; 15. ITG Symposium, Leipzig, Germany, 2014, pp. 1-8. (Year: 2014).*

Ricardo Blasco-Serrano et al.,"Polar Codes for Cooperative Relaying",IEEE Transactions on Communications, vol. 60, No. 11, Nov. 2012,total 11 pages.

Erdal Arikan,"Channel Polarization: A Method for Constructing Capacity-Achieving Codes for Symmetric Binary-Input Memoryless Channels",IEEE Transactions on Information Theory, vol. 55, No. 7, Jul. 2009,total 23 pages.

Huawei Technologies, Vision on 5G Radio Access Technologies, 3GPP workshop Sep. 17, 2015_18_RAN_5G RWS-150006, Sep. 2015,total 18 pages.

Samsung, UE Specific CRC and Tail bit for HS-SCCH, 3GPP TSG-RAN WG1#24R1-020390, Feb. 19, 2002,total 3 pages.

* cited by examiner

METHOD AND APPARATUS FOR CARRYING IDENTIFICATION INFORMATION

CROSS-REFERENCE TO RELATED APPLICATIONS

This application is a continuation of International Application No. PCT/CN2017/095459 filed on Aug. 1, 2017, and claims priority to Chinese Patent Application No. 201610652304.5, filed on Aug. 10, 2016, and claims priority to PCT Application No. PCT/CN2017/091167, filed on Jun. 30, 2017. The disclosures of the aforementioned applications are hereby incorporated by reference in their entireties.

TECHNICAL FIELD

This application relates to the field of communications technologies, and in particular, to a method and an apparatus for carrying identification information.

BACKGROUND

In a radio network communications system, when scheduling a terminal, a base station usually identifies different terminals by using identification information, and the base station sends scheduling information in a manner of scrambling the identification information.

For example, a radio network temporary identifier (RNTI) is a type of information for identifying a terminal by a base station in a Long Term Evolution (LTE) system. An existing RNTI length is 16 bits. As shown in FIG. 1, in a physical downlink control channel (PDCCH) encoding process, a base station first performs 16-bit cyclic redundancy check (CRC) encoding on to-be-sent downlink control information (DCI), where information obtained after the encoding includes DCI information and 16-bit CRC information, and then the base station performs an exclusive OR (XOR) operation (namely, a scrambling operation) on 16-bit RNTI information and the 16-bit CRC information to obtain 16-bit CRC information after RNTI scrambling, concatenates the 16-bit CRC information obtained after the RNTI scrambling to the foregoing DCI information, and performs channel coding, modulation, mapping, and sending processes.

In a 5th Generation (5G) communications system and more possible future communications systems, a massive machine type communications (mMTC) application scenario may exist, requiring wide coverage and massive access. If the foregoing manner of performing RNTI scrambling on CRC information is used in an existing system, because the RNTI length is limited to 16 bits and the 16-bit RNTI can identify only 65536 terminals, this RNTI scrambling manner obviously cannot meet requirements of the massive access application scenario in the future.

SUMMARY

Embodiments of this application provide a method and an apparatus for carrying identification information, to resolve a problem that only a relatively small quantity of terminals can be identified in an existing manner of carrying identification information, while reducing complexity of blind detection or increasing an early stop rate during polar code SCL decoding.

Specific technical solutions provided in the embodiments of this application are as follows:

According to a first aspect, a method for carrying identification information is provided. The method includes: determining, by a base station, bit locations that can be used to carry identification information in to-be-coded bits; adding the identification information to the bit locations; encoding, in a polar code encoding mode, the to-be-coded bits that carry the identification information; and sending an encoded polar code to a terminal. The bit locations that can be used to carry the identification information include locations of fixed bits, the fixed bits are used by the terminal to perform error correction in a decoding process, and the identification information is used to identify the terminal. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the adding, by the base station, the identification information to the bit locations may be implemented in the following manner: placing the identification information into the bit locations when the bit locations are idle; or adding the identification information to the bit locations in a scrambling manner when the bit locations are not idle. In this way, the identification information is directly used as fixed bits, so that the fixed bits can play an original error correction function, and the locations of the fixed bits can be used to carry the identification information.

In one embodiment, the to-be-coded bits include information bits, and the information bits include source information bits and cyclic redundancy check CRC information bits corresponding to the source information bits. The bit locations further include locations of the CRC information bits.

In one embodiment, the adding, by the base station, the identification information to the bit locations may be implemented in the following manner: adding, by the base station, the identification information to the bit locations based on a specified mapping relationship.

In one embodiment, the adding, by the base station, the identification information to the bit locations based on a specified mapping relationship may be implemented in the following manner: scrambling, by the base station, a first part of the identification information into the CRC information bits; and scrambling, by the base station, a second part of the identification information into the fixed bits; or placing the second part into the locations of the fixed bits when the locations of the fixed bits are idle, where the first part is different from the second part, or there is an intersection between the first part and the second part. In this way, the identification information is scrambled into CRC bits, so that reliability can be improved and decoding accuracy of the terminal can be improved. On this basis, more of the identification information is carried in the fixed bits, so that a length of bits for carrying the identification information can be extended. The first part and the second part may be a part or all of the identification information.

In one embodiment, the adding, by the base station, the identification information to the bit locations based on a specified mapping relationship may alternatively be implemented in the following manner: scrambling, by the base station, all the identification information into the fixed bits; or placing all the identification information into the locations of the fixed bits when the locations of the fixed bits are idle.

In one embodiment, the adding, by the base station, the identification information to the bit locations based on a specified mapping relationship may alternatively be implemented in the following manner: scrambling, by the base station, a first part of the identification information into the CRC information bits; and repeating, by the base station, a second part of the identification information at least one time and sequentially scrambling the repeated second parts into the fixed bits, or when the locations of the fixed bits are idle, repeating the second part at least one time and sequentially placing the repeated second parts into the locations of the fixed bits, where the first part is different from the second part, or there is an intersection between the first part and the second part. In this way, reliability of carrying the identification information is improved in a repetitive carrying manner.

In one embodiment, the adding, by the base station, the identification information to the bit locations may be implemented in the following manner: performing, by the base station, ranking based on reliability of the bit locations, and sequentially selecting high-reliability bit locations from the bit locations to carry the identification information.

In one embodiment, the adding, by the base station, the identification information to the bit locations based on a specified mapping relationship may be implemented in the following manner: repeating, by the base station, a part or all of the identification information at least one time and adding the repeated identification information to the locations of the fixed bits, where a quantity of times of repeating the identification information successively increases in descending order of reliability of the locations of the fixed bits. In this way, the identification information added to locations of low-reliability fixed bits is repeated at least one time, to increase a decoding success rate of the terminal.

A rule of selecting the fixed bits may be not limited to the foregoing manner of performing ranking based on reliability. Ranking may alternatively be performed based on a PW, a row weight in a polar encoding matrix, a natural order of polar sub-channels, or the like. When rate matching is performed through shortening, sequence numbers of shortened sub-channels are used as fixed bits. Reliability of these fixed bits is very high, and these fixed bits may be preferentially selected during mapping.

In one embodiment, a part, scrambled into CRC bits and corresponding to a back location in a natural order of polar sub-channels, of the identification information is also preferentially scrambled into a fixed bit with highest reliability/a largest row weight/a highest natural order number. For example, identification information scrambled into a last CRC bit is also scrambled into the fixed bit with the highest reliability/the largest row weight/the highest natural order number.

In one embodiment, the identification information is scrambled into a fixed bit with highest reliability/a largest row weight/a highest natural order number.

In one embodiment, when a length of user identification information is shorter than a length of CRC, the identification information is preferentially scrambled into front CRC information bits in a natural order of the CRC information bits.

In one embodiment, the identification information is an RNTI.

In one embodiment, the identification information is a sequence number of the terminal or a group number of a terminal group.

The identification information may be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/the group number of the terminal group. Alternatively, the identification information may be a pseudorandom number related to all or a part of the RNTI/the sequence number/the group number of the terminal group. For example, the RNTI may be used as a seed or an initial value to generate various random sequences.

According to a second aspect, a method for carrying identification information is provided. The method includes: receiving, by a terminal, an encoded polar code sent by a base station, and determining locations of fixed bits in the polar code; adding, by the terminal, a part or all of identification information to the locations of the fixed bits; and decoding, by the terminal, the polar code based on the fixed bits that carry the identification information, where the identification information is used to identify the terminal. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the adding, by the terminal, a part or all of identification information to the locations of the fixed bits may be implemented in the following manner: scrambling, by the terminal, a part or all of the identification information into the fixed bits; or placing a part or all of the identification information into the locations of the fixed bits when the locations of the fixed bits are idle. In this way, the identification information is directly used as fixed bits, so that the fixed bits can play an original error correction function, and the locations of the fixed bits can be used to carry the identification information.

In one embodiment, the adding, by the terminal, a part or all of identification information to the locations of the fixed bits may be implemented in the following manner: repeating, by the terminal, a part or all of the identification information at least one time and sequentially scrambling the repeated identification information into the fixed bits; or when the locations of the fixed bits are idle, repeating a part or all of the identification information at least one time and sequentially placing the repeated identification information into the locations of the fixed bits.

In one embodiment, the identification information is an RNTI.

In one embodiment, the identification information is a sequence number of the terminal or a group number of a terminal group.

In one embodiment, the identification information may be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/the group number of the terminal group. Alternatively, the identification information may be a pseudorandom number related to all or a part of the RNTI/the sequence number/the group number of the terminal group. For example, the RNTI may be used as a seed or an initial value to generate various random sequences.

According to a third aspect, an apparatus for carrying identification information is provided, and the apparatus for carrying identification information has a function of implementing behavior of the base station in the first aspect and any embodiment of the first aspect. The function may be implemented by hardware, or may be implemented by hardware executing corresponding software. The hardware or the software includes one or more modules corresponding to the foregoing function.

In one embodiment, the apparatus for carrying identification information includes: a determining unit, configured to determine bit locations that can be used to carry identification information in to-be-coded bits, where the bit locations that can be used to carry the identification information include locations of fixed bits, the fixed bits are used by a terminal to perform error correction in a decoding process, and the identification information is used to identify the terminal; a carrying unit, configured to add the identification information to the bit locations that are determined by the determining unit; an encoding unit, configured to encode, in a polar code encoding mode, the to-be-coded bits that carry the identification information; and a sending unit, configured to send a polar code encoded by the encoding unit to the terminal. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the carrying unit is configured to: place the identification information into the bit locations when the bit locations are idle; or add the identification information to the bit locations in a scrambling manner when the bit locations are not idle. In this way, the identification information is directly used as fixed bits, so that the fixed bits can play an original error correction function, and the locations of the fixed bits can be used to carry the identification information.

In one embodiment, the to-be-coded bits include information bits, and the information bits include source information bits and cyclic redundancy check CRC information bits corresponding to the source information bits. The bit locations further include locations of the CRC information bits.

In one embodiment, the carrying unit is configured to add the identification information to the bit locations based on a specified mapping relationship.

In one embodiment, the carrying unit is further configured to: scramble a first part of the identification information into the CRC information bits; and scramble a second part of the identification information into the fixed bits; or place the second part into the locations of the fixed bits when the locations of the fixed bits are idle, where the first part is different from the second part, or there is an intersection between the first part and the second part. The first part and the second part may be a part or all of the identification information. In this way, the identification information is scrambled into CRC bits, so that reliability can be improved and decoding accuracy of the terminal can be improved. On this basis, more of the identification information is carried in the fixed bits, so that a length of bits for carrying the identification information can be extended.

In one embodiment, the carrying unit is further configured to: scramble all the identification information into the fixed bits; or place all the identification information into the locations of the fixed bits when the locations of the fixed bits are idle.

In one embodiment, the carrying unit is further configured to: scramble a first part of the identification information into the CRC information bits; and repeat a second part of the identification information at least one time and sequentially scramble the repeated second parts into the fixed bits, or when the locations of the fixed bits are idle, repeat the second part at least one time and sequentially place the repeated second parts into the locations of the fixed bits, where the first part is different from the second part, or there is an intersection between the first part and the second part. In this way, reliability of carrying the identification information is improved in a repetitive carrying manner.

In one embodiment, the carrying unit is further configured to: perform ranking based on reliability of the bit locations, and sequentially select high-reliability bit locations from the bit locations to carry the identification information.

A rule of selecting the fixed bits may be not limited to the foregoing manner of performing ranking based on reliability. Ranking may alternatively be performed based on a PW, a row weight in a polar encoding matrix, a natural order of polar sub-channels, or the like. When rate matching is performed through shortening, sequence numbers of shortened sub-channels are used as fixed bits. Reliability of these fixed bits is very high, and these fixed bits may be preferentially selected during mapping.

In one embodiment, a part, scrambled into CRC bits and corresponding to a back location in a natural order of polar sub-channels, of the identification information is also preferentially scrambled into a fixed bit with highest reliability/a largest row weight/a highest natural order number. For example, identification information scrambled into a last CRC bit is also scrambled into the fixed bit with the highest reliability/the largest row weight/the highest natural order number.

In one embodiment, the identification information is scrambled into a fixed bit with highest reliability/a largest row weight/a highest natural order number.

In one embodiment, when a length of user identification information is shorter than a length of CRC, the identification information is preferentially scrambled into front CRC information bits in a natural order of the CRC information bits.

In one embodiment, the identification information is an RNTI.

In one embodiment, the identification information is a sequence number of the terminal or a group number of a terminal group.

The identification information may be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/the group number of the terminal group. Alternatively, the identification information may be a pseudorandom number related to all or a part of the RNTI/the sequence number/the group number of the terminal group. For example, the RNTI may be used as a seed or an initial value to generate various random sequences.

According to a fourth aspect, an apparatus for carrying identification information is provided, and the apparatus for carrying identification information has a function of implementing behavior of the terminal in the second aspect and any embodiment of the second aspect. The function may be implemented by hardware, or may be implemented by hardware executing corresponding software. The hardware or the software includes one or more modules corresponding to the foregoing function.

In one embodiment, the apparatus for carrying identification information includes: a receiving unit, configured to: receive an encoded polar code sent by a base station, and determine locations of fixed bits in the polar code; a carrying unit, configured to add a part or all of identification information to the locations of the fixed bits received by the receiving unit, where the identification information is used to identify the apparatus; and a decoding unit, configured to decode the polar code based on the fixed bits that carry the identification information. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the carrying unit is configured to: scramble a part or all of the identification information into the fixed bits; or place a part or all of the identification information into the locations of the fixed bits when the locations of the fixed bits are idle. In this way, the identification information is directly used as fixed bits, so that the fixed bits can play an original error correction function, and the locations of the fixed bits can be used to carry the identification information.

In one embodiment, the carrying unit is configured to: repeat a part or all of the identification information at least one time and sequentially scramble the repeated identification information into the fixed bits; or when the locations of the fixed bits are idle, repeat a part or all of the identification information at least one time and sequentially place the repeated identification information into the locations of the fixed bits.

In one embodiment, the identification information is an RNTI.

In one embodiment, the identification information is a sequence number of a terminal or a group number of a terminal group.

In one embodiment, the identification information may be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/the group number of the terminal group. Alternatively, the identification information may be a pseudorandom number related to all or a part of the RNTI/the sequence number/the group number of the terminal group. For example, the RNTI may be used as a seed or an initial value to generate various random sequences.

According to a fifth aspect, an apparatus for carrying identification information is provided, and the apparatus for carrying identification information has a function of implementing behavior of the base station in the first aspect and any embodiment of the first aspect. The function may be implemented by hardware, or may be implemented by hardware executing corresponding software. The hardware or the software includes one or more modules corresponding to the foregoing function.

In one embodiment, the apparatus for carrying identification information includes a transceiver, a processor, and a memory, and both the transceiver and the memory are connected to the processor. The memory stores a set of programs, and the processor is configured to invoke the programs stored in the memory, so that the apparatus for carrying identification information performs the method in the first aspect or any embodiment of the first aspect.

According to a sixth aspect, an apparatus for carrying identification information is provided, and the apparatus for carrying identification information has a function of implementing behavior of the terminal in the second aspect and any embodiment of the second aspect. The function may be implemented by hardware, or may be implemented by hardware executing corresponding software. The hardware or the software includes one or more modules corresponding to the foregoing function.

In one embodiment, the apparatus for carrying identification information includes a transceiver, a processor, and a memory, and both the transceiver and the memory are connected to the processor. The memory stores a set of programs, and the processor is configured to invoke the programs stored in the memory, so that the apparatus for carrying identification information performs the method in the second aspect or any embodiment of the second aspect.

According to the method and the apparatus for carrying identification information provided in the embodiments of this application, the to-be-coded bits are encoded in the polar code encoding mode, and in an encoding process, the identification information is added to the locations of the fixed bits in the polar code, so that a length of the identification information that can be represented by the bits can be increased without bringing any other overheads, and a quantity of terminals that can be identified by the identification information can be increased accordingly. This provides support for meeting requirements of a future massive access application scenario.

DESCRIPTION OF EMBODIMENTS

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

The embodiments of this application provide a method and an apparatus for carrying identification information, to resolve a problem that only a relatively small quantity of terminals can be identified in an existing manner of carrying identification information. To-be-coded bits are encoded through polar code encoding, and in an encoding process, identification information is added to locations of fixed bits in a polar code, so that a length of identification information that can be represented by the bits can be increased without bringing any other overheads, and a quantity of terminals that can be identified by the identification information can be increased accordingly. This provides support for meeting requirements of a future massive access application scenario.

Figure 1:
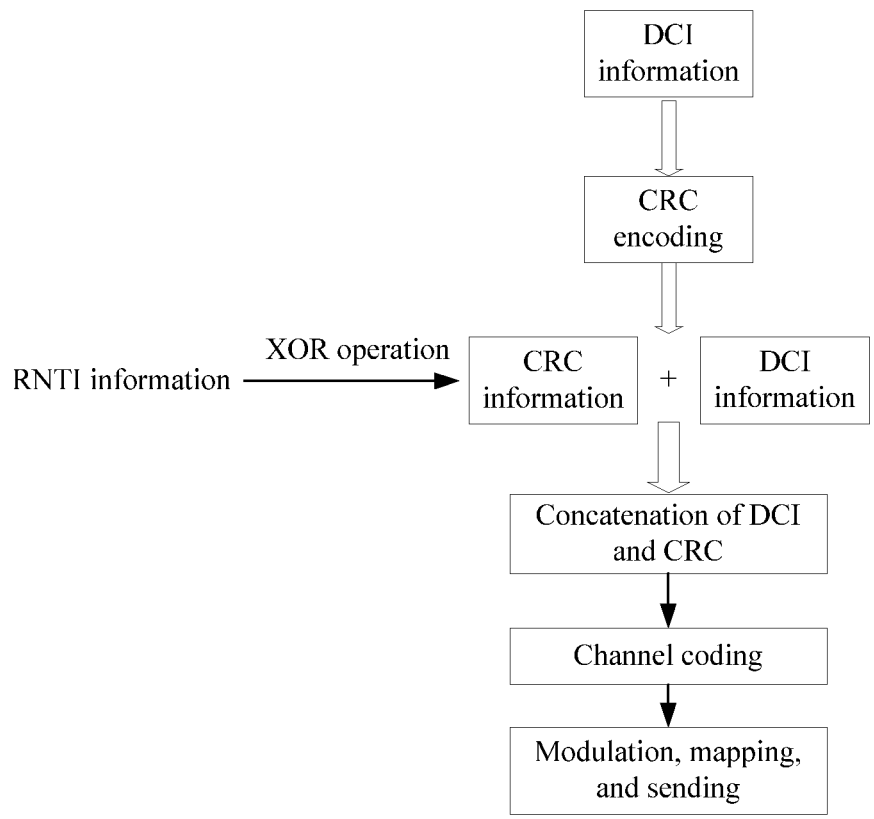
FIG. 1 is a schematic diagram of a PDCCH encoding process in the prior art.
Figure 2:
FIG. 2 is a schematic diagram of a system architecture according to an embodiment of this application.

As shown in FIG. 2, a system architecture applied to the embodiments of this application includes a base station 101 and a terminal 102. The base station 101 is an apparatus that is deployed in a radio access network to provide a wireless communication function for the terminal 102. The base station 101 may include various forms of macro base stations, micro base stations, relay stations, access points, and the like; and may be applied to systems with different radio access technologies, for example, an LTE system or more possible communications systems such as a 5G communications system. The base station 101 may alternatively be another network device that has a function of a base station, and in particular, may be a terminal that functions as a base station in device-to-device (D2D) communication. The terminal 102 may include various handheld devices, in-vehicle devices, wearable devices, or computing devices that have a wireless communication function; or another processing device connected to a wireless modem; and various forms of user equipment (UE), mobile stations (MS), and the like.

An encoding mode used in the embodiments of this application is a polar code encoding mode. The following in one embodiment describes the polar code encoding mode.

Figure 3:
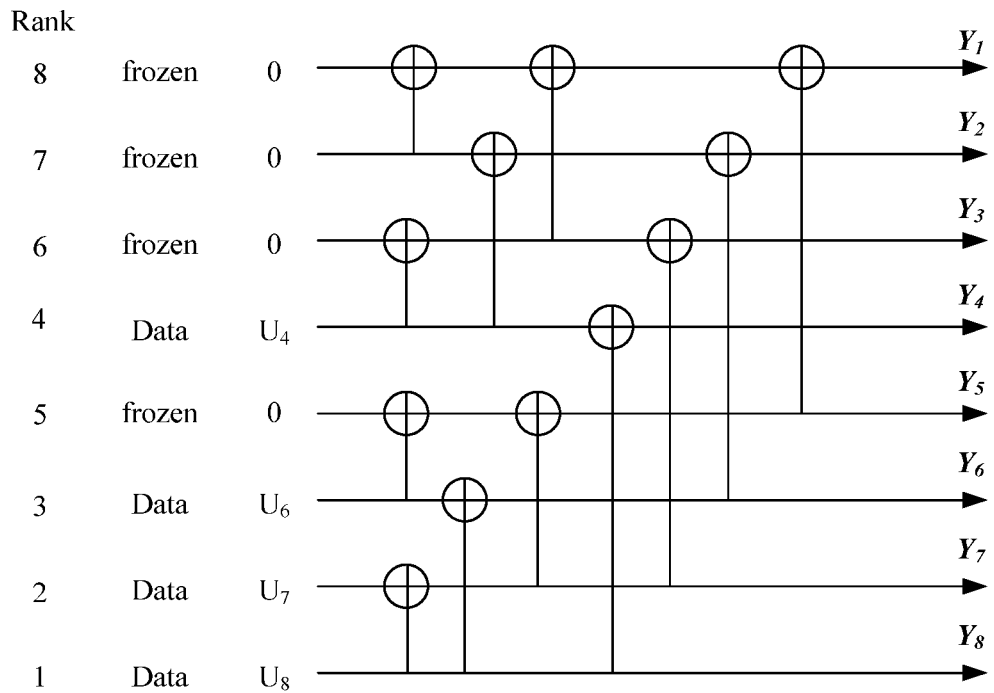
FIG. 3 is a schematic diagram of a polar code encoding mode according to an embodiment of this application.

The polar code encoding mode is characterized by high performance, low complexity, and a flexible rate matching manner. As shown in FIG. 3, an 8×8 polar code encoding matrix is displayed, where input to-be-coded bits are represented by a vector (0, 0, 0, U4, 0, U6, U7, U8), and bits obtained after encoding is performed by using the encoding matrix are represented by a vector (Y1, Y2, Y3, Y4, Y5, Y6, Y7, Y8). The to-be-coded bit vector may be divided into two parts: information bits that are marked as data bits in FIG. 3, such as $U_4$, $U_6$, $U_7$, and $U_8$; and fixed bits that are marked as frozen bits in FIG. 3, such as 0, 0, 0, and 0. In application, an information bit needs to be known only by a transmit end, but a fixed bit needs to be known by both the transmit end and a receive end. The fixed bits are used to perform error correction in a decoding process of the receive end, to improve a success rate of decoding information bit locations. In addition, due to a polarization effect of a polar code, reliability of each bit in the to-be-coded bits has a polarization characteristic, and error probability varies according to different bit locations. A ranking column is marked as Rank in FIG. 3, the ranking column represents reliability ranking of different bit locations, and a smaller rank number indicates higher reliability. Usually, an information bit is placed at a location with relatively high reliability, to improve decoding performance.

Figure 4:
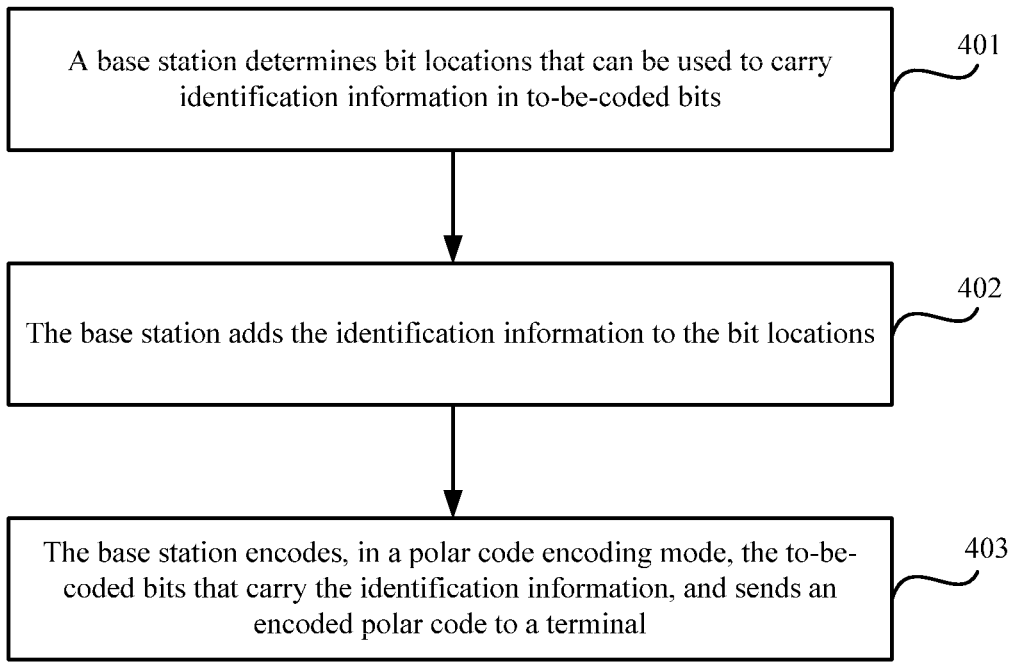
FIG. 4 is a flowchart 1 of a method for carrying identification information according to an embodiment of this application.

Based on the system architecture shown in FIG. 2, as shown in FIG. 4, a process of a method for carrying identification information provided in an embodiment of this application is as follows:

Operation 401: A base station determines bit locations that can be used to carry identification information in to-be-coded bits.

The bit locations that can be used to carry the identification information include locations of fixed bits, and the fixed bits are used by a terminal to perform error correction in a decoding process. The to-be-coded bits include information bits, and the information bits include source information bits and CRC information bits corresponding to the source information bits. In one embodiment, the bit locations that can be used to carry the identification information may further include locations of the CRC information bits.

Operation 402: The base station adds the identification information to the bit locations that can be used to carry the identification information.

The identification information is used to identify the terminal. In a common case, the identification information is an RNTI.

In one embodiment, when the bit locations are idle, the base station places the identification information into the bit locations in an explicit manner; or when the bit locations are not idle, the base station adds the identification information to the bit locations in an implicit manner such as a scrambling manner.

In one embodiment, the fixed bits are used by the terminal to perform error correction in the decoding process, to improve a success rate of decoding information bit locations. The base station and the terminal need to negotiate the locations of the fixed bits in advance, and the terminal needs to learn content in the fixed bits. Therefore, a part or all of the identification information may be directly placed as fixed bits into idle locations of the fixed bits.

In one embodiment, the base station adds the identification information to the bit locations based on a specified mapping relationship. In one embodiment, the specified mapping relationship may include but is not limited to the following several mapping relationships.

1. The base station scrambles a first part of the identification information into the CRC information bits; and scrambles a second part of the identification information into the fixed bits; or places the second part into the locations of the fixed bits in an explicit manner when the locations of the fixed bits are idle, where the first part is different from the second part, or there is an intersection between the first part and the second part.

2. The base station scrambles all the identification information into the fixed bits; or places all the identification information into the locations of the fixed bits in an explicit manner when the locations of the fixed bits are idle.

In this case, the base station may not perform scrambling by using the CRC information bits. Certainly, the base station may scramble the identification information into the CRC information bits, that is, perform repeated scrambling.

3. The base station scrambles a first part of the identification information into the CRC information bits.

The base station repeats a second part of the identification information at least one time and sequentially scrambles the repeated second parts into the fixed bits; or when the locations of the fixed bits are idle, the base station repeats the second part at least one time and sequentially places the repeated second parts into the locations of the fixed bits. The first part is different from the second part, or there is an intersection between the first part and the second part.

When the base station adds the identification information to the locations of the fixed bits, a quantity of times of repeating the identification information successively increases in descending order of reliability of the locations of the fixed bits. For example, the identification information is repeated once and then is added to locations of fixed bits with highest reliability, or the identification information is repeated twice and then is added to locations of fixed bits with second-highest reliability, or the identification information is repeated three times and then is added to locations of fixed bits with relatively low reliability.

Certainly, in this embodiment of this application, during selection of locations of fixed bits for carrying the identification information, a manner of ranking the fixed bits may be not limited to the foregoing manner of performing ranking based on reliability. For example, ranking may be performed in a polar weight manner or the like. The polar weight manner is a manner of determining a rank based on a structural characteristic of a polar code encoding matrix, and one method is as follows:

It is assumed that sequence numbers of to-be-coded bits are N numerical values from 0 to (N−1), and the N numerical values are denoted as <B0, B1, . . . , Bn−1> in a binary mode. Using N=8 as an example, a sequence number 0 is denoted as <000>, a sequence number 1 is denoted as <001>, a sequence number 2 is denoted as <010>, and so on. A polar weight corresponding to each sequence number is calculated based on a binary mode, and a calculation formula is $$W = \sum_{j=0}^{N-1} B_j * 2^{j*\frac{1}{4}}.$$

In the foregoing example, a polar weight of the sequence number 0 is $W_0=0*2^{(0*(1/4))}+0*2^{(1*(1/4))}+0*2^{(2*(1/4))}=0$, and a polar weight of the sequence number 1 is $W_1=1*2^{(0*(1/4))}+0*2^{(1*(1/4))}+0*2^{(2*(1/4))}=1$. A larger value of W indicates a higher rank, or may be understood as higher "reliability", and corresponds to a smaller value of Rank in FIG. 3.

In one embodiment, when scrambling the identification information into the fixed bits or placing the identification information into the locations of the fixed bits, the base station selects bit locations with relatively high reliability from the locations of the fixed bits for scrambling or placing the identification information, so that decoding accuracy of the terminal can be improved.

Operation 403: The base station encodes, in a polar code encoding mode, the to-be-coded bits that carry the identification information, and sends an encoded polar code to a terminal.

In operation 402, a possible implementation process includes the following operations (1) to (4).

(1) The base station first performs CRC encoding on the source information bits, where encoded information bits include the source information bits and the CRC information bits.

(2) The base station scrambles the identification information into the CRC information bits.

Certainly, a length of the identification information may be greater than a length of the CRC information bits. In this case, if the length of the identification information is represented as K, and the length of the CRC information bits is represented as L, a first part, whose length is L, of the identification information is scrambled into the CRC information bits, and a second part, whose length is (K−L), of the identification information is added to the locations of the fixed bits in the following operation (4).

(3) The base station concatenates the source information bits and the CRC information bits obtained after the scrambling, to form concatenated information bits.

(4) The base station adds the second part of the identification information to the locations of the fixed bits.

If the locations of the fixed bits are idle, the second part is directly placed into the locations of the fixed bits, that is, the second part is used as fixed bits. If the locations of the fixed bits are not idle, that is, fixed bits exist, the second part may be scrambled into the fixed bits.

There may be a plurality of other possible implementation processes for operation 402, in addition to the foregoing possible implementation process. The bit locations used to carry the identification information include the locations of the CRC information bits and the locations of the fixed bits, and the bit locations used to carry the identification information are extended as compared with the existing locations of the CRC information bits that are used to carry the identification information. In other words, a length of the to-be-coded bits that can carry the identification information is extended.

In all bit locations used to carry the identification information, bit locations for carrying the identification information may be selected based on the following priority: the locations of the CRC information bits, and then bit locations that are obtained by ranking the locations of the fixed bits based on reliability. In other words, the locations of the CRC information bits are first selected to carry the identification information based on a maximum length that can be carried by the locations of the CRC information bits, and then the locations of the fixed bits are sequentially selected in descending order of reliability to carry the identification information. Alternatively, locations may be randomly selected, from all the bit locations that are used to carry the identification information, to carry the identification information.

The first part, carried in the locations of the CRC information bits, of the identification information and the second part, carried in the locations of the fixed bits, of the identification information may be different from each other and complementary to each other. In other words, two divided parts of the identification information are respectively carried in the locations of the CRC information bits and the locations of the fixed bits, and there may be an overlapping portion between the first part and the second part, that is, the overlapping portion is repeatedly carried. The first part and the second part may be a part or all of the identification information.

Figure 5:
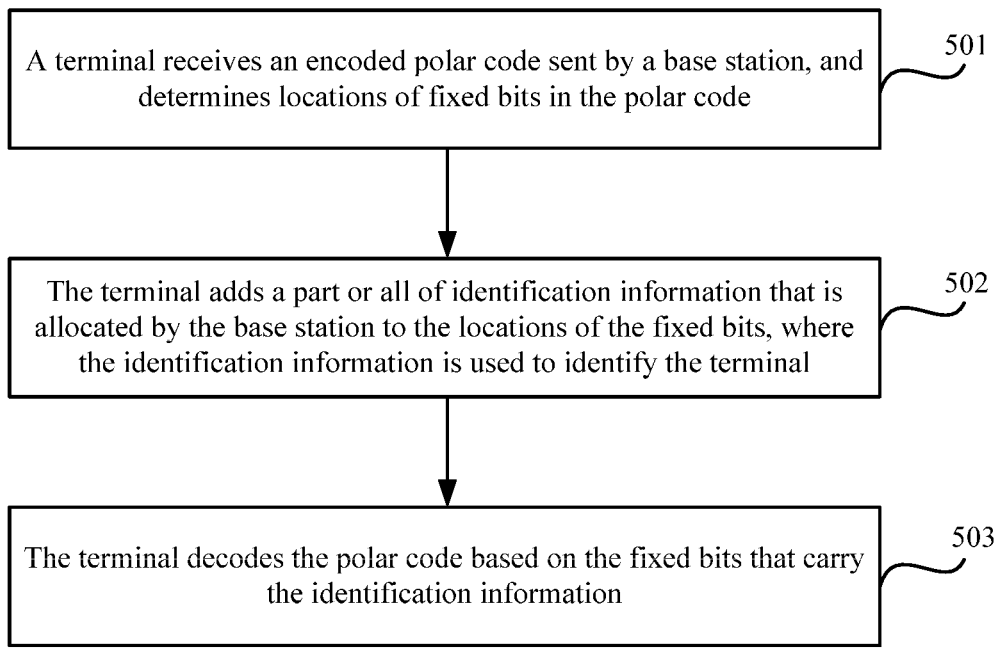
FIG. 5 is a flowchart 2 of a method for carrying identification information according to an embodiment of this application.

Till now, a manner of scrambling the identification information on a base station side has been described. After the encoded polar code is sent to the terminal, the terminal decodes the received polar code. Correspondingly, based on the method for carrying identification information shown in FIG. 4, as shown in FIG. 5, an embodiment of this application provides another method for carrying identification information in a scrambling manner.

Operation 501: A terminal receives an encoded polar code sent by a base station, and determines locations of fixed bits in the polar code.

In one embodiment, after receiving the polar code, the terminal first performs a demapping process and a demodulation process.

Operation 502: The terminal adds a part or all of identification information to the locations of the fixed bits, where the identification information is used to identify the terminal.

In one embodiment, the terminal obtains in advance bit locations that are used by the base station to carry each part of the identification information in an encoding process, and adds the identification information to corresponding locations of the fixed bits based on the obtained information. If the base station has added the identification information also to locations of CRC information bits, after operation 503, the terminal descrambles the CRC information bits based on a part, added to the locations of the CRC information bits, of the identification information.

Operation 503: The terminal decodes the polar code based on the fixed bits that carry the identification information.

In one embodiment, in operation 502, the terminal adds a part or all of the identification information to the locations of the fixed bits, and the adding may be implemented in the following possible manners:

The terminal scrambles a part or all of the identification information into the fixed bits; or places a part or all of the identification information into the locations of the fixed bits in an explicit manner when the locations of the fixed bits are idle.

In one embodiment, the terminal repeats a part or all of the identification information at least one time and sequentially scrambles the repeated identification information into the fixed bits; or when the locations of the fixed bits are idle, the terminal repeats a part or all of the identification information at least one time and sequentially places the repeated identification information into the locations of the fixed bits.

A rule of selecting the fixed bits may be not limited to the foregoing manner of performing ranking based on reliability. Ranking may alternatively be performed based on a polar weight (PW), a row weight in a polar encoding matrix, a natural order of polar sub-channels, or the like. When rate matching is performed through shortening, sequence numbers of shortened sub-channels are used as fixed bits. Reliability of these fixed bits is relatively high, and these fixed bits may be preferentially selected during mapping.

Alternatively, the identification information may be scrambled into a fixed bit with highest reliability/a largest row weight/a highest natural order number.

Alternatively, a part, scrambled into CRC bits and corresponding to a back location in a natural order of polar sub-channels, of the identification information may also be preferentially scrambled into a fixed bit with highest reliability/a largest row weight/a highest natural order number. For example, identification information scrambled into a last CRC bit is also scrambled into the fixed bit with the highest reliability/the largest row weight/the highest natural order number.

Alternatively, when a length of the identification information is shorter than a length of CRC, the identification information is preferentially scrambled into front CRC information bits in a natural order of the CRC information bits.

A common representation form of the identification information is an RNTI, or may be a sequence number of the terminal, a group number of a terminal group, or the like. The following uses an example in which the identification information is an RNTI to further describe this embodiment of this application in detail with reference to a specific application scenario in which the source information bit is DCI.

Figure 6:
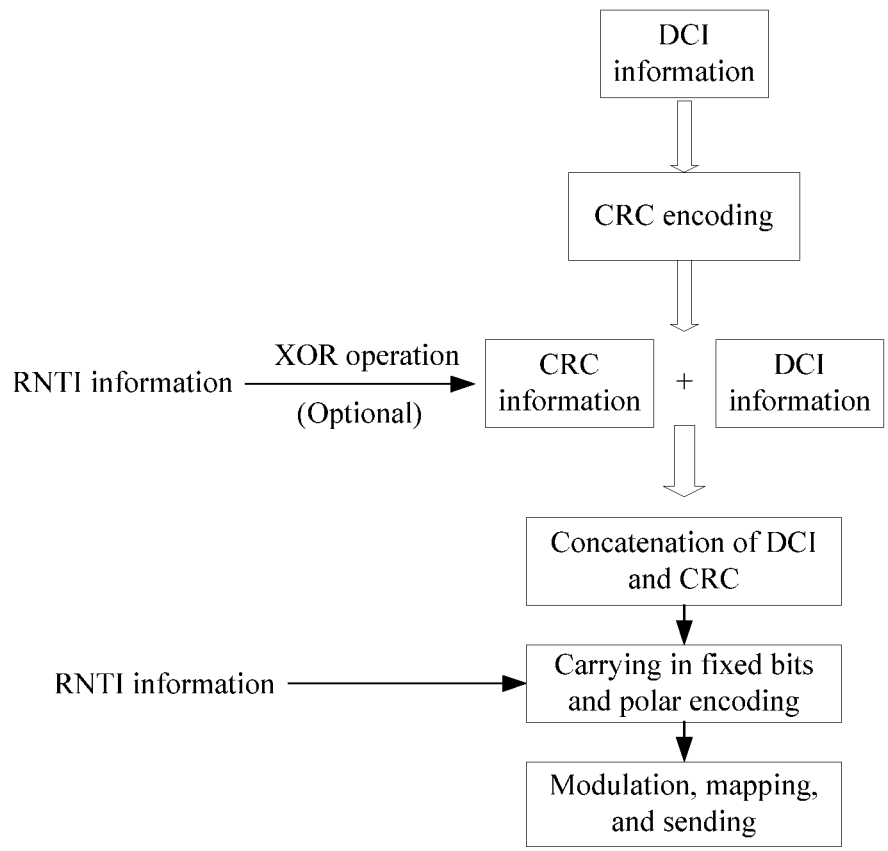
FIG. 6 is a schematic diagram of a PDCCH encoding process according to an embodiment of this application.

It is assumed that an RNTI length is X bits, and a CRC length is 16 bits, where X is greater than 16. As shown in FIG. 6, in a PDCCH encoding process, a base station first performs 16-bit CRC encoding on to-be-sent DCI, where information bits obtained after the encoding include DCI information bits and 16 CRC information bits. The base station performs an XOR operation on a part, whose length is 16 bits, of an RNTI and 16-bit CRC information to obtain 16-bit CRC information after RNTI scrambling, and concatenates the 16-bit CRC information obtained after the RNTI scrambling to the foregoing DCI information. The base station adds the other part, whose length is (X−16) bits, of the RNTI to locations of fixed bits, or the base station adds a part, whose length is x bits, of the RNTI to locations of fixed bits, where there is an overlapping portion between the part whose length is x bits and the part whose length is 16 bits, and the part whose length is x bits includes the other part whose length is (X−16) bits. The base station performs polar code encoding, modulation, mapping, and sending processes on the scrambled information bits and the fixed bits that carry the identification information.

Figure 7:
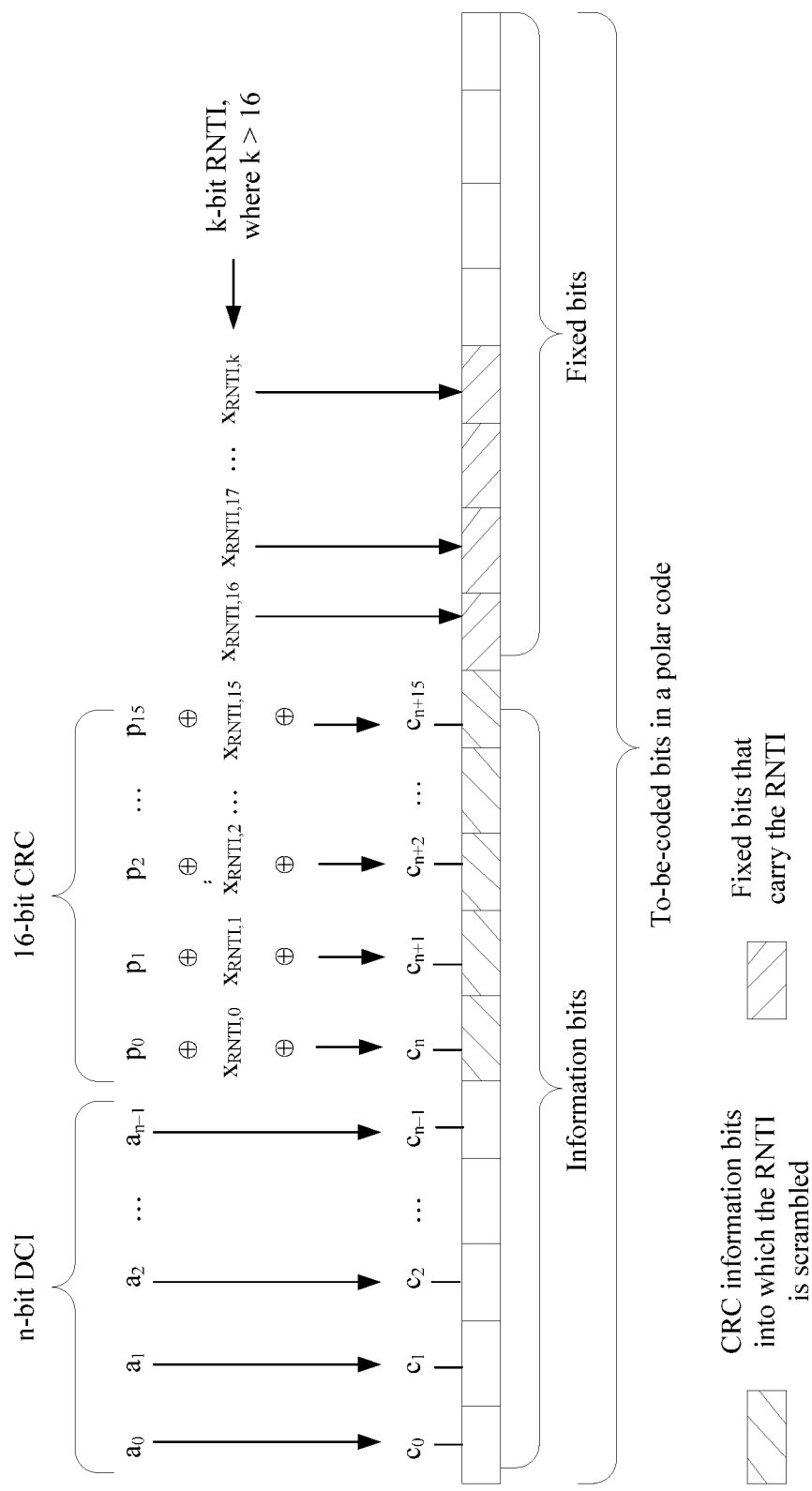
FIG. 7 is a schematic diagram 1 of a manner of carrying an RNTI according to an embodiment of this application.

For example, an implementation of scrambling two different parts of an RNTI respectively into CRC information bits and fixed bits is shown in FIG. 7. DCI whose length is n bits includes $\{a_0, a_1, a_2, \ldots, a_{n-1}\}$, which are mapped to information bits $\{c_0, c_1, c_2, \ldots, c_{n-1}\}$ in to-be-coded bits of a polar code. CRC whose length is 16 bits includes $\{p_0, p_1, p_2, \ldots, p_{15}\}$. If a total length of the RNTI is k bits and k>16, bits 0 to 15 of the RNTI are scrambled into the 16 CRC bits, that is, $\{X_{RNTI,0}, X_{RNTI,1}, X_{RNTI,2}, \ldots, X_{RNTI,15}\}$ are scrambled into $\{p_0, p_1, p_2, \ldots, p_{15}\}$, and $\{p_0, p_1, p_2, \ldots, p_{15}\}$ are mapped to information bits $\{c_n, c_{n+1}, c_{n+2}, \ldots, c_{n+15}\}$ in the to-be-coded bits of the polar code; and remaining (k−16) bits $\{X_{RNTI,16}, X_{RNTI,17}, X_{RNTI,18}, \ldots, X_{RNTI,k}\}$ of the RNTI are carried in locations of fixed bits in the to-be-coded bits of the polar code. A carrying manner may be a scrambling manner, or a manner of directly placing the bits into idle locations of the fixed bits.

The identification information may alternatively be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/ the group number of the terminal group. Alternatively, the identification information may be a pseudorandom number related to all or a part of the RNTI/the sequence number/the group number of the terminal group. For example, the RNTI may be used as a seed or an initial value to generate various random sequences.

Ranking may be performed based on reliability of the fixed bits, and locations of fixed bits with relatively high reliability are selected for carrying the identification information.

It can be learned from FIG. 7 that, an effective bit width of RNTI bits that can be represented by a PDCCH is extended without bringing any other overheads, and a quantity of terminals that can be identified by identification information is increased.

Certainly, the manner of carrying an RNTI shown in FIG. 7 is merely an example. In more possible implementations, for example, some or all of the bits in $\{x_{RNTI,0}, x_{RNTI,1}, x_{RNTI,2}, \ldots, x_{RNTI,15}\}$ may be scrambled into fixed bits. More examples are further described in FIG. 9a to FIG. 9d. In sum, in addition to original CRC information bits, locations of fixed bits can also be used to carry an RNTI, so that an RNTI with a longer bit length can be carried.

Figure 8:
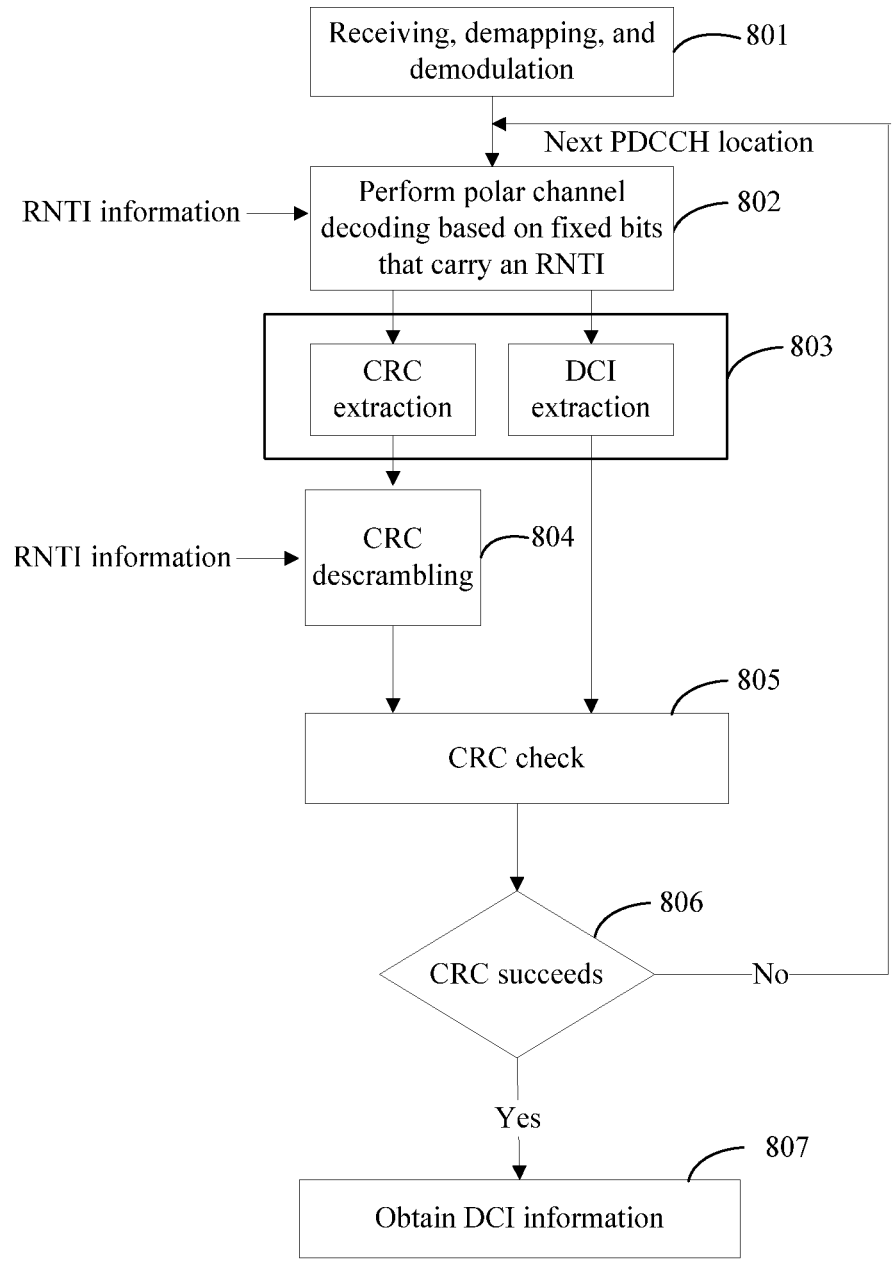
FIG. 8 is a schematic diagram of a PDCCH decoding process according to an embodiment of this application.

Correspondingly, a PDCCH decoding process is shown in FIG. 8.

Operation 801: A terminal receives a polar code, and performs a demapping process and a demodulation process.

Operation 802: The terminal selects a PDCCH location, and based on determined bit locations to which identification information has been added by a base station, the terminal adds, to locations of fixed bits in the polar code, an RNTI that is allocated by the base station to the terminal to identify the terminal, and decodes the polar code based on the fixed bits that carry the RNTI.

Operation 803: Extract CRC information bits and DCI information bits from the decoded polar code.

Operation 804: Perform descrambling on the extracted CRC information bits. This operation is optional. This operation is omitted if the locations that are determined by the terminal and to which the identification information has been added by the base station do not include the CRC information bits.

Operation 805: Perform CRC check on decoded DCI information.

Operation 806: Determine whether CRC check succeeds; if yes, perform operation 807; otherwise, select a next PDCCH location and perform operation 802.

Operation 807: Obtain the decoded DCI information and end the process.

It needs to be noted that, in an existing PDCCH receiving mechanism, whether a PDCCH is required by the terminal is determined by determining whether CRC check is correct, and therefore the terminal performs CRC check each time when selecting a PDCCH location, and probability of missing the CRC check is increased with an increase in a quantity of check times. If CRC aided decoding (CA-SCL) is used in a polar code decoding mode in this embodiment of this application, CRC check is performed many times in each decoding process, thereby increasing the probability of missing the CRC check. In view of this, in this embodiment of this application, before operation 802 is performed, coarse selection is performed on PDCCH locations by using the following design, so that a range of PDCCH locations required by the terminal can be determined to a great extent. In this way, a quantity of CRC check times in a operation shown in FIG. 8 is reduced, and even no CRC check is needed at all, thereby relieving the problem about missing the CRC check. The design is in one embodiment as follows:

The terminal performs successive-cancellation (SC) decoding on the polar code by using fixed bits that carry the RNTI, and observes a value of a path metric in a polar code decoding process to approximately determine whether a detected PDCCH belongs to the terminal. A determining principle is as follows: An absolute value of a path metric value obtained during detection of a PDCCH that belongs to the terminal is less than an absolute value of a path metric value obtained during detection of a PDCCH that does not belong to the terminal.

The following describes various possible manners of carrying the identification information with reference to specific examples. Certainly, the following are merely examples, and cannot cover all possible implementations of this embodiment of this application.

In the following examples, after CRC encoding is performed on DCI, a CRC length is 16 bits, and a length of a polar code is 64 bits. An RNTI may be explicitly carried in fixed bits, that is, the RNTI is directly used as fixed bits, or the RNTI may be implicitly carried in fixed bits, for example, the RNTI is scrambled into fixed bits.

Example 1

Figure 9A:
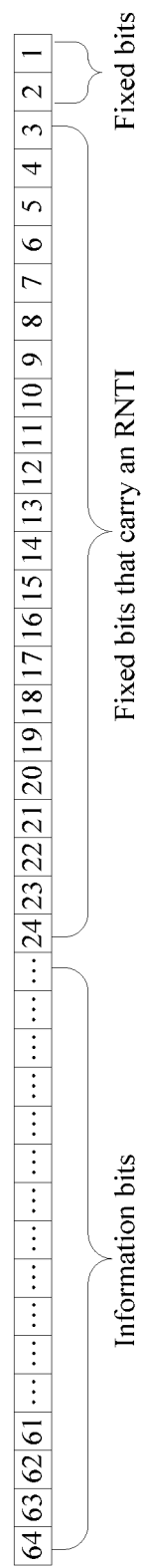
FIG. 9a is a schematic diagram 2 of a manner of carrying an RNTI according to an embodiment of this application.

As shown in FIG. 9a, the base station adds all of the RNTI to fixed bits in to-be-coded bits of the polar code, and performs polar encoding.

If a total length of DCI information bits and CRC information bits is 44 bits, a length of fixed bits is 64−44=20 bits. A length of the RNTI is 18 bits, 18 bit locations are selected from locations of the fixed bits, and the RNTI is scrambled into the selected 18 fixed bits, or when the locations of the 18 fixed bits are idle, the RNTI is directly used as fixed bits. During the selection of the locations of the fixed bits for carrying the RNTI, 18 high-reliability bit locations may be selected. In this example, a length of an RNTI that can be carried on a PDCCH may exceed the CRC length, namely, 16 bits.

The terminal adds the RNTI to the locations of the 18 fixed bits in the received polar code, decodes the polar code based on the fixed bits that carry the RNTI, and descrambles the CRC information bits. If CRC check on a decoding result succeeds, it indicates that a correct PDCCH is found.

Example 2

Figure 9B:
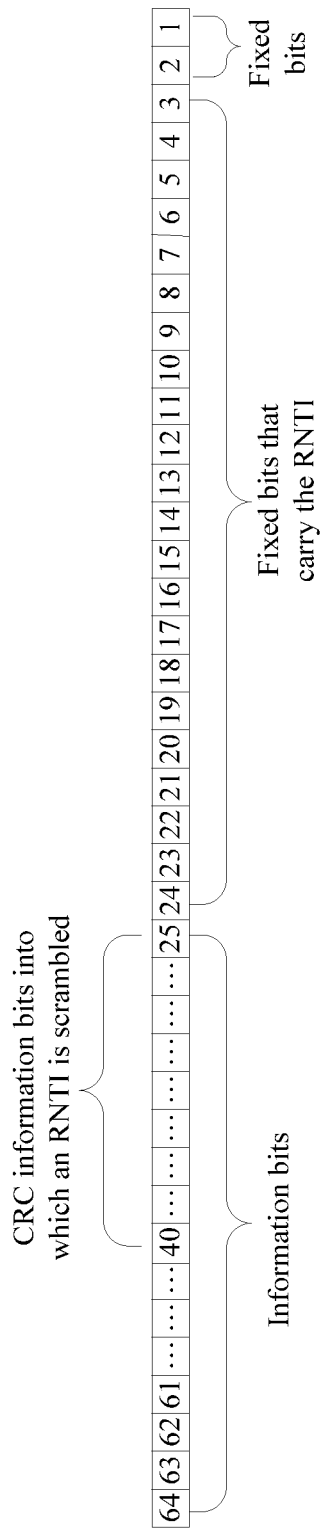
FIG. 9b is a schematic diagram 3 of a manner of carrying an RNTI according to an embodiment of this application.

As shown in FIG. 9b, the base station adds all of the RNTI to locations of fixed bits in to-be-coded bits of the polar code, performs polar encoding, and selects 16 bits from a value of the RNTI to scramble the selected 16 bits into CRC information bits corresponding to the DCI.

In this example, a length of an RNTI that can be carried on a PDCCH may exceed the CRC length, namely, 16 bits.

The terminal uses the RNTI to scramble 18 fixed bits in the received polar code, decodes the polar code based on the scrambled fixed bits, and descrambles the CRC information bits. If CRC check on a decoding result succeeds, it indicates that a correct PDCCH is found.

Example 3

Figure 9C:
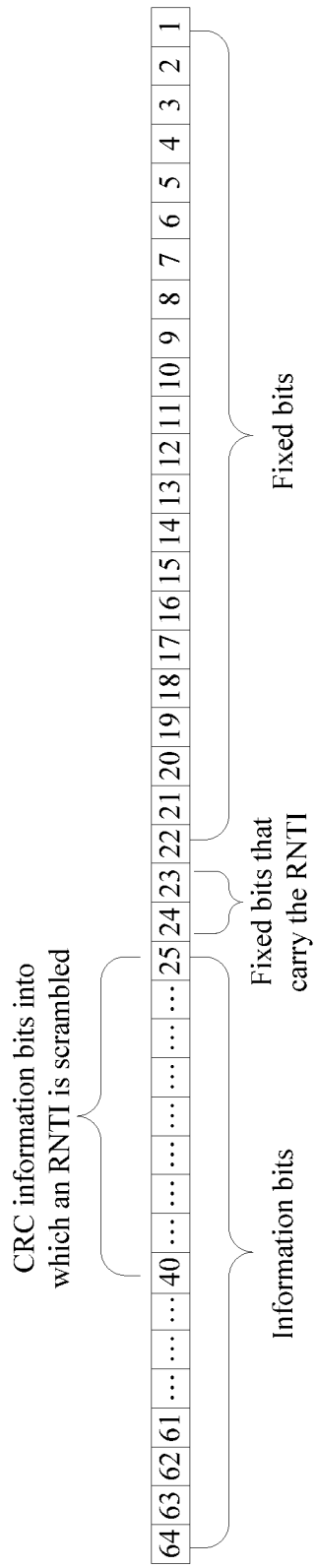
FIG. 9c is a schematic diagram 4 of a manner of carrying an RNTI according to an embodiment of this application.

As shown in FIG. 9c, the base station adds a part of the RNTI to locations of fixed bits in to-be-coded bits of the polar code, performs polar encoding, and scrambles a remaining part of the RNTI into CRC information bits.

For example, two most significant bits of the RNTI are carried in locations of fixed bits in the to-be-coded bits of the polar code, and remaining 16 bits of the RNTI are scrambled into CRC information bits. Similarly, if a total length of DCI information bits and CRC information bits is 44 bits, a length of locations of fixed bits is 64−44=20 bits. A length of the RNTI is 18 bits, two bit locations are selected from the locations of the fixed bits, and the two most significant bits of the RNTI are carried in the selected two fixed bits. During the selection of the locations of the fixed bits for carrying the RNTI, two high-reliability bit locations may be selected. In this example, a length of an RNTI that can be carried on a PDCCH may exceed the CRC length, namely, 16 bits.

The terminal adds, to the locations of the two fixed bits in the received polar code during decoding, the two most significant bits of the RNTI allocated by the base station to the terminal, decodes the polar code based on the fixed bits that carry the RNTI, and descrambles the CRC information bits. If CRC check on a decoding result succeeds, it indicates that a correct PDCCH is found.

Example 4

The base station adds all or a part of the RNTI to locations of fixed bits in the polar code in a specified repetitive carrying mode, and performs polar encoding.

First, the base station selects a part of the RNTI to be added to the fixed bits, adds the selected part to the locations of the fixed bits in a specified repetitive carrying mode, scrambles a remaining part of the RNTI into CRC information bits, and performs polar encoding on to-be-coded bits that carry the RNTI.

Figure 9D:
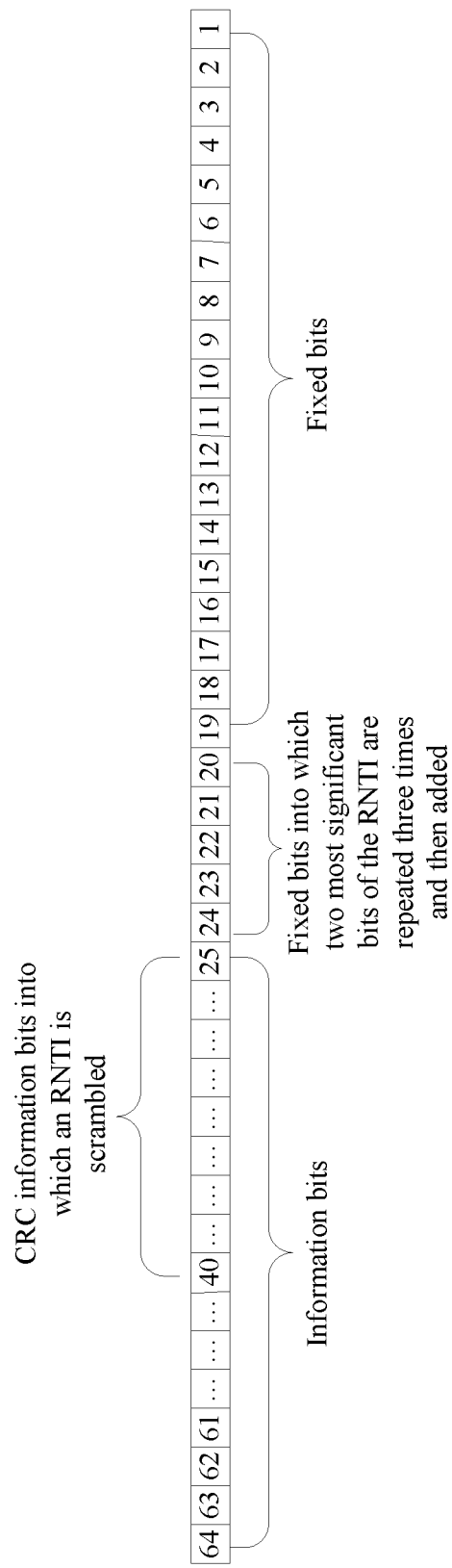
FIG. 9d is a schematic diagram 5 of a manner of carrying an RNTI according to an embodiment of this application.

Based on example 3, as shown in FIG. 9d, if two most significant bits of the RNTI are repeated three times in a specified repetitive carrying mode to obtain six bits, and the six bits are added to locations of fixed bits in the polar code, remaining 16 bits of the RNTI are scrambled into the CRC information bits. During the selection of the locations of the fixed bits for carrying the RNTI, six high-reliability bits may be selected. In this example, a length of an RNTI that can be carried on a PDCCH may exceed the CRC length, namely, 16 bits.

The terminal adds, to the locations of the six fixed bits in a specified repetitive carrying mode during decoding, the two most significant bits of the RNTI allocated by the base station to the terminal, decodes the polar code based on the fixed bits that carry the RNTI, and descrambles the CRC information bits by using the remaining bits of the RNTI. If CRC check on a decoding result succeeds, it indicates that a required PDCCH is found.

Example 5

Figure 10:
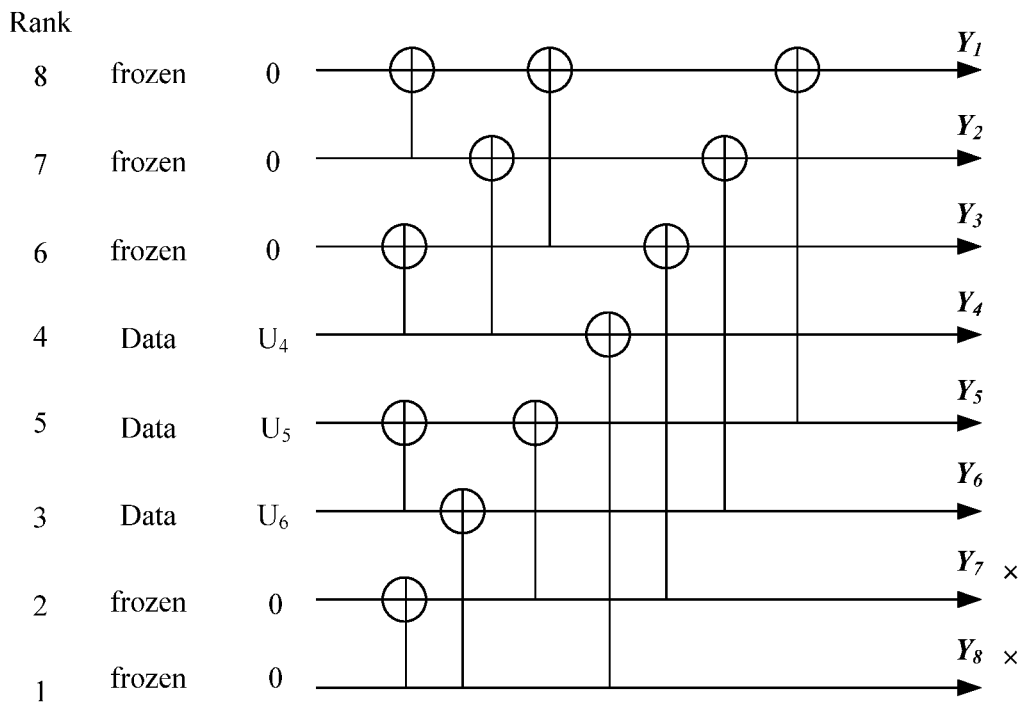
FIG. 10 is a schematic diagram of a polar structure using shortening according to an embodiment of this application.

In this example, first, it needs to be noted that shortening is a common polar rate matching method. A characteristic of shortening is that a value of an encoded bit that is punctured is only related to a fixed bit, to reduce impact of puncturing on polar code performance. In a typical shortening design, fixed bits are placed at last several locations. As shown in FIG. 10, last two encoded bits are punctured, to reduce impact of puncturing on polar code performance. Based on this idea, last two bits in to-be-coded bits are set as fixed bits.

If rate matching is performed on the polar code through shortening, reliability of a fixed bit that affects a punctured bit is usually high. As shown in FIG. 10, fixed bits that affect punctured bits Y7 and Y8 are the last two fixed bits of the to-be-coded bits, and reliability of the two fixed bits is usually high. When selecting fixed bits for scrambling the RNTI, the base station preferentially selects fixed bits that affect punctured bits. After such selection, when the terminal determines a PDCCH in the foregoing manner of comparing a path metric value, a path metric value obtained during detection of a correct PDCCH is significantly reduced as compared with another value, to help the terminal find the correct PDCCH.

In addition, if rate matching is performed on the polar code through shortening, reliability of some fixed bits may be ranked before reliability of the information bits. To carry the RNTI in locations of fixed bits, high-reliability fixed bits should be preferentially selected.

Figure 9E:
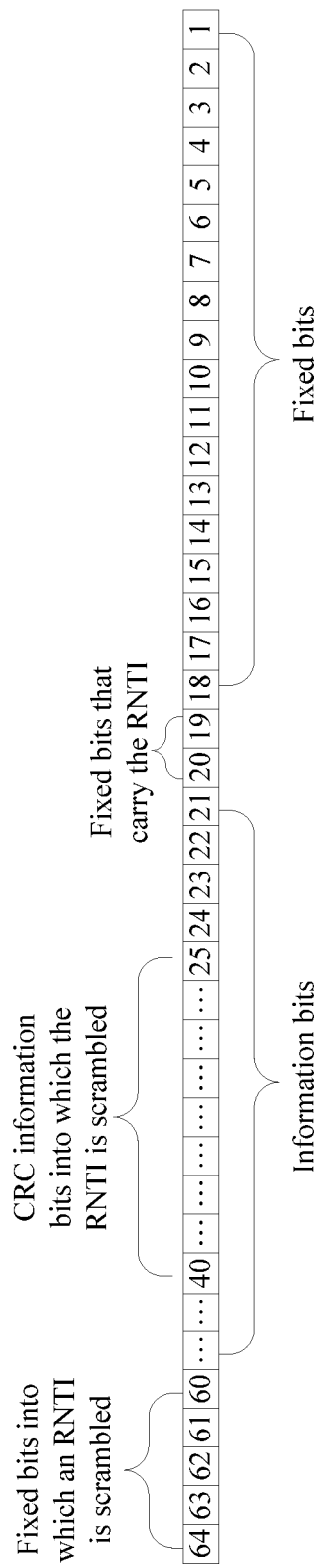
FIG. 9e is a schematic diagram 6 of a manner of carrying an RNTI according to an embodiment of this application.

As shown in FIG. 9e, fixed bits selected by the base station to carry the RNTI are locations of fixed bits that affect punctured bits and locations of fixed bits whose reliability is higher than reliability of the information bits. For example, the base station adds a part of the RNTI to locations of fixed bits in the to-be-coded bits of the polar code, performs polar encoding, selects 16 bits from a value of the RNTI, and scrambles the selected 16 bits into CRC information bits corresponding to the DCI. In this example, a length of an RNTI that can be carried on a PDCCH may exceed the CRC length, namely, 16 bits.

Figure 11:
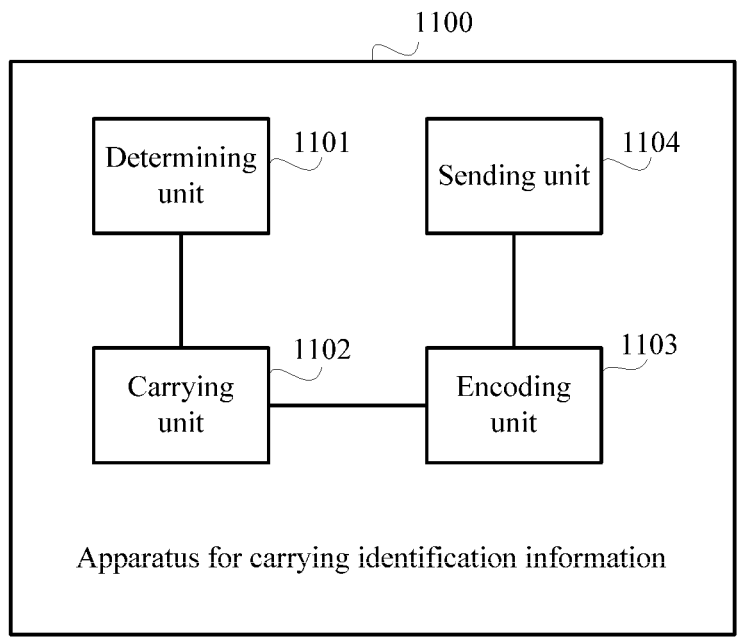
FIG. 11 is a structural diagram 1 of an apparatus for carrying identification information according to an embodiment of this application.

As shown in FIG. 11, an embodiment of this application further provides an apparatus 1100 for carrying identification information. The apparatus 1100 for carrying identification information has a function of implementing behavior of the base station in the foregoing method for carrying identification information. The function may be implemented by hardware, or may be implemented by hardware executing corresponding software. The hardware or the software includes one or more modules corresponding to the foregoing function.

In one embodiment, the apparatus 1100 for carrying identification information includes a determining unit 1101, a carrying unit 1102, an encoding unit 1103, and a sending unit 1104.

The determining unit 1101 is configured to determine bit locations that can be used to carry identification information in to-be-coded bits, where the bit locations that can be used to carry the identification information includes locations of fixed bits, the fixed bits are used by a terminal to perform error correction in a decoding process, and the identification information is used to identify the terminal. The carrying unit 1102 is configured to add the identification information to the bit locations that are determined by the determining unit. The encoding unit 1103 is configured to encode, in a polar code encoding mode, the to-be-coded bits that carry the identification information. The sending unit 1104 is configured to send a polar code encoded by the encoding unit to the terminal. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the carrying unit 1102 is configured to: place the identification information into the bit locations when the bit locations are idle; or add the identification information to the bit locations in a scrambling manner when the bit locations are not idle. In this way, the identification information is directly used as fixed bits, so that the fixed bits can play an original error correction function, and the locations of the fixed bits can be used to carry the identification information.

In one embodiment, the to-be-coded bits include information bits, and the information bits include source information bits and cyclic redundancy check CRC information bits corresponding to the source information bits. The bit locations further include locations of the CRC information bits.

In one embodiment, the carrying unit 1102 is configured to add the identification information to the bit locations based on a specified mapping relationship.

In one embodiment, the carrying unit 1102 is further configured to: scramble a first part of the identification information into the CRC information bits; and scramble a second part of the identification information into the fixed bits; or place the second part into the locations of the fixed bits when the locations of the fixed bits are idle, where the first part is different from the second part, or there is an intersection between the first part and the second part. In this way, the identification information is scrambled into CRC bits, so that reliability can be improved and decoding accuracy of the terminal can be improved. On this basis, more of the identification information is carried in the fixed bits, so that a length of bits for carrying the identification information can be extended.

In one embodiment, the carrying unit 1102 is further configured to: scramble all the identification information into the fixed bits; or place all the identification information into the locations of the fixed bits when the locations of the fixed bits are idle.

In one embodiment, the carrying unit 1102 is further configured to: scramble a first part of the identification information into the CRC information bits; and repeat a second part of the identification information at least one time and sequentially scramble the repeated second parts into the fixed bits, or when the locations of the fixed bits are idle, repeat the second part at least one time and sequentially place the repeated second parts into the locations of the fixed bits, where the first part is different from the second part, or there is an intersection between the first part and the second part. The first part and the second part may be a part or all of the identification information. In this way, reliability of carrying the identification information is improved in a repetitive carrying manner.

In one embodiment, the carrying unit 1102 is further configured to: perform ranking based on reliability of the bit locations, and sequentially select high-reliability bit locations from the bit locations to carry the identification information.

A rule of selecting the fixed bits may be not limited to the foregoing manner of performing ranking based on reliability. Ranking may alternatively be performed based on a polar weight (PW), a row weight in a polar encoding matrix, a natural order of polar sub-channels, or the like. When rate matching is performed through shortening, sequence numbers of shortened sub-channels are used as fixed bits. Reliability of these fixed bits is relatively high, and these fixed bits may be preferentially selected during mapping.

Alternatively, the identification information may be scrambled into a fixed bit with highest reliability/a largest row weight/a highest natural order number.

Alternatively, a part, scrambled into CRC bits and corresponding to a back location in a natural order of polar sub-channels, of the identification information may also be preferentially scrambled into a fixed bit with highest reliability/a largest row weight/a highest natural order number. For example, identification information scrambled into a last CRC bit is also scrambled into the fixed bit with the highest reliability/the largest row weight/the highest natural order number.

Alternatively, when a length of the identification information is shorter than a length of CRC, the identification information is preferentially scrambled into front CRC information bits in a natural order of the CRC information bits.

In one embodiment, the identification information is an RNTI, or a sequence number of the terminal, or a group number of a terminal group.

The identification information may be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/the group number of the terminal group. Alternatively, the identification information may be a pseudorandom number related to all or a part of the RNTI/the sequence number/the group number of the terminal group. For example, the RNTI may be used as a seed or an initial value to generate various random sequences.

Figure 12:
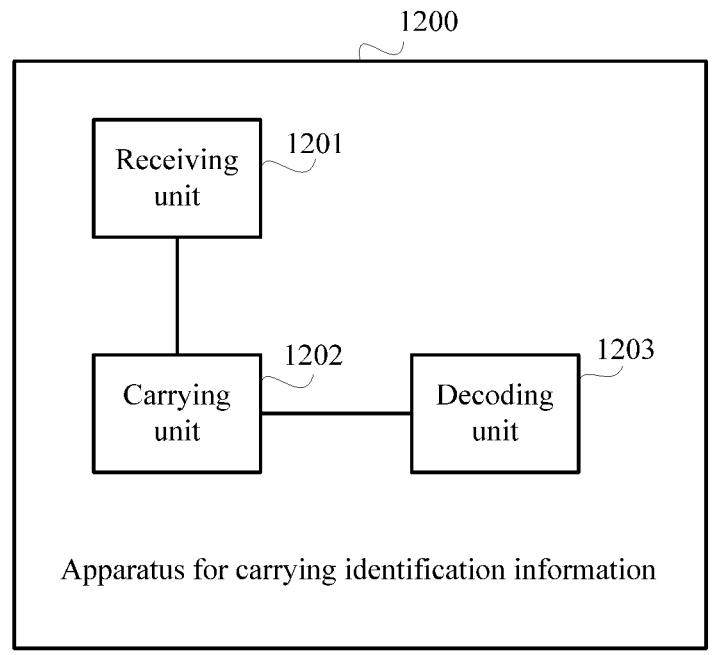
FIG. 12 is a structural diagram 2 of an apparatus for carrying identification information according to an embodiment of this application.

As shown in FIG. 12, an embodiment of this application further provides an apparatus 1200 for carrying identification information, and the apparatus 1200 for carrying identification information has a function of implementing behavior of the terminal in the foregoing method for carrying identification information. The function may be implemented by hardware, or may be implemented by hardware executing corresponding software. The hardware or the software includes one or more modules corresponding to the foregoing function.

In one embodiment, the apparatus 1200 for carrying identification information includes a receiving unit 1201, a carrying unit 1202, and a decoding unit 1203.

The receiving unit 1201 is configured to: receive an encoded polar code sent by a base station, and determine locations of fixed bits in the polar code. The carrying unit 1202 is configured to add a part or all of identification information to the locations of the fixed bits received by the receiving unit, where the identification information is used to identify the apparatus. The decoding unit 1203 is configured to decode the polar code based on the fixed bits that carry the identification information. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the carrying unit 1202 is configured to: scramble a part or all of the identification information into the fixed bits; or place a part or all of the identification information into the locations of the fixed bits when the locations of the fixed bits are idle. In this way, the identification information is directly used as fixed bits, so that the fixed bits can play an original error correction function, and the locations of the fixed bits can be used to carry the identification information.

In one embodiment, the carrying unit 1202 is configured to: repeat a part or all of the identification information at least one time and sequentially scramble the repeated identification information into the fixed bits; or when the locations of the fixed bits are idle, repeat a part or all of the identification information at least one time and sequentially place the repeated identification information into the locations of the fixed bits.

In one embodiment, the identification information is an RNTI.

Figure 13:
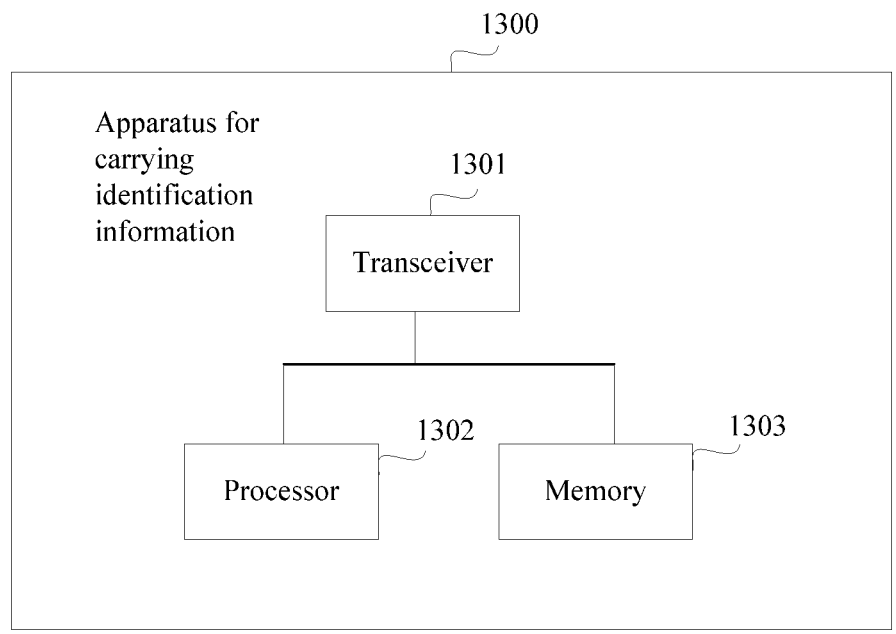
FIG. 13 is a structural diagram 3 of an apparatus for carrying identification information according to an embodiment of this application.

As shown in FIG. 13, an embodiment of this application further provides an apparatus 1300 for carrying identification information, and the apparatus 1300 for carrying identification information has a function of implementing behavior of the base station in the foregoing method design for carrying identification information. The function may be implemented by hardware, or may be implemented by hardware executing corresponding software. The hardware or the software includes one or more modules corresponding to the foregoing function.

In one embodiment, the apparatus 1300 for carrying identification information includes a transceiver 1301, a processor 1302, and a memory 1303, and both the transceiver 1031 and the memory 1303 are connected to the processor 1302. The memory 1301 stores a set of programs, and the processor 1302 is configured to invoke the programs stored in the memory 1301, so that the apparatus 1300 for carrying identification information performs the method in the first aspect or any embodiment of the first aspect.

It needs to be noted that a manner of connection between the parts shown in FIG. 13 is merely a possible example. Alternatively, both the transceiver 1301 and the memory 1303 are connected to the processor 1302, and the transceiver 1301 and the memory 1303 are not connected to each other, or another possible connection manner may be used.

The processor 1302 is configured to: determine bit locations that can be used to carry identification information in to-be-coded bits, where the bit locations that can be used to carry the identification information include locations of fixed bits, the fixed bits are used by a terminal to perform error correction in a decoding process, and the identification information is used to identify the terminal; add the identification information to the determined bit locations; encode, in a polar code encoding mode, the to-be-coded bits that carry the identification information; and send an encoded polar code to the terminal by using the transceiver 1301. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the processor 1302 is further configured to: place the identification information into the bit locations when the bit locations are idle; or add the identification information to the bit locations in a scrambling manner when the bit locations are not idle. In this way, the identification information is directly used as fixed bits, so that the fixed bits can play an original error correction function, and the locations of the fixed bits can be used to carry the identification information.

In one embodiment, the to-be-coded bits include information bits, and the information bits include source information bits and cyclic redundancy check CRC information bits corresponding to the source information bits. The bit locations further include locations of the CRC information bits.

In one embodiment, the processor 1302 is further configured to add the identification information to the bit locations based on a specified mapping relationship.

In one embodiment, the processor 1302 is further configured to: scramble a first part of the identification information into the CRC information bits; and scramble a second part of the identification information into the fixed bits; or place the second part into the locations of the fixed bits when the locations of the fixed bits are idle, where the first part is different from the second part, or there is an intersection between the first part and the second part. The first part and the second part may be a part or all of the identification information. In this way, the identification information is scrambled into CRC bits, so that reliability can be improved and decoding accuracy of the terminal can be improved. On this basis, more of the identification information is carried in the fixed bits, so that a length of bits for carrying the identification information can be extended.

In one embodiment, the processor 1302 is further configured to: scramble all the identification information into the fixed bits; or place all the identification information into the locations of the fixed bits when the locations of the fixed bits are idle.

In one embodiment, the processor 1302 is further configured to: scramble a first part of the identification information into the CRC information bits; and repeat a second part of the identification information at least one time and sequentially scramble the repeated second parts into the fixed bits, or when the locations of the fixed bits are idle, repeat the second part at least one time and sequentially place the repeated second parts into the locations of the fixed bits, where the first part is different from the second part, or there is an intersection between the first part and the second part. In this way, reliability of carrying the identification information is improved in a repetitive carrying manner.

In one embodiment, the processor 1302 is further configured to: perform ranking based on reliability of the bit locations, and sequentially select high-reliability bit locations from the bit locations to carry the identification information.

A rule of selecting the fixed bits may be not limited to the foregoing manner of performing ranking based on reliability. Ranking may alternatively be performed based on a polar weight (PW), a row weight in a polar encoding matrix, a natural order of polar sub-channels, or the like. When rate matching is performed through shortening, sequence numbers of shortened sub-channels are used as fixed bits. Reliability of these fixed bits is relatively high, and these fixed bits may be preferentially selected during mapping.

Alternatively, the identification information may be scrambled into a fixed bit with highest reliability/a largest row weight/a highest natural order number.

Alternatively, a part, scrambled into CRC bits and corresponding to a back location in a natural order of polar sub-channels, of the identification information may also be preferentially scrambled into a fixed bit with highest reliability/a largest row weight/a highest natural order number. For example, identification information scrambled into a last CRC bit is also scrambled into the fixed bit with the highest reliability/the largest row weight/the highest natural order number.

Alternatively, when a length of the identification information is shorter than a length of CRC, the identification information is preferentially scrambled into front CRC information bits in a natural order of the CRC information bits.

In one embodiment, the identification information is an RNTI, or a sequence number of the terminal, or a group number of a terminal group.

The identification information may alternatively be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/ the group number of the terminal group. Alternatively, the identification information may be a pseudorandom number related to all or a part of the RNTI/the sequence number/the group number of the terminal group. For example, the RNTI may be used as a seed or an initial value to generate various random sequences.

An embodiment of this application further provides an apparatus 1400 for carrying identification information, and the apparatus 1400 for carrying identification information has a function of implementing behavior of the terminal in the second aspect and any embodiment of the second aspect. The function may be implemented by hardware, or may be implemented by hardware executing corresponding software. The hardware or the software includes one or more modules corresponding to the foregoing function.

In one embodiment, the apparatus 1400 for carrying identification information includes a transceiver 1401, a processor 1402, and a memory 1403, and both the transceiver 1401 and the memory 1403 are connected to the processor 1402. The memory 1403 stores a set of programs, and the processor 1402 is configured to invoke the programs stored in the memory 1403, so that the apparatus 1400 for carrying identification information performs the foregoing method for carrying identification information.

Figure 14:
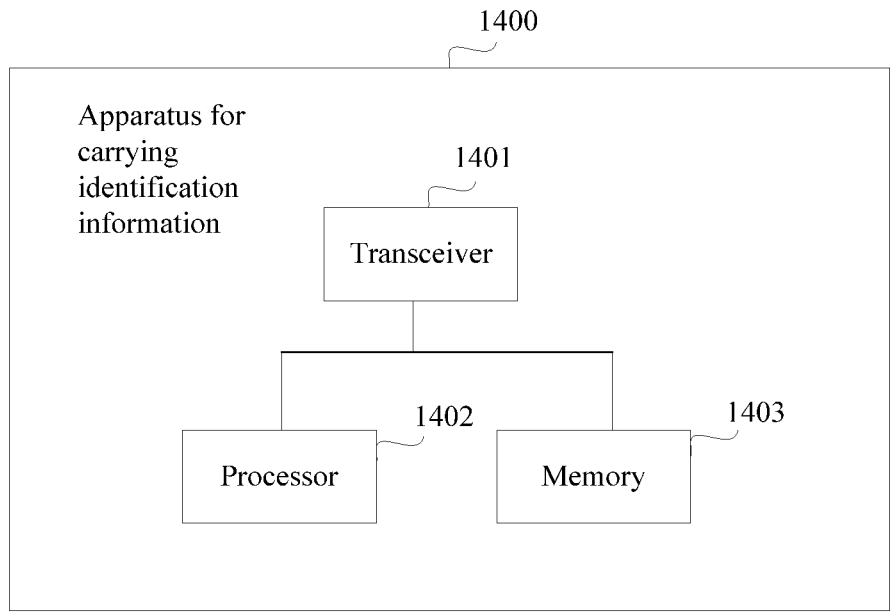
FIG. 14 is a structural diagram 4 of an apparatus for carrying identification information according to an embodiment of this application.

It needs to be noted that a manner of connection between the parts shown in FIG. 14 is merely a possible example. Alternatively, both the transceiver 1401 and the memory 1403 are connected to the processor 1402, and the transceiver 1401 and the memory 1403 are not connected to each other, or another possible connection manner may be used.

In one embodiment, the processor 1402 is configured to: schedule the transceiver 1401 to receive an encoded polar code sent by a base station, and determine locations of fixed bits in the polar code; add a part or all of identification information to the locations of the fixed bits received by the transceiver 1401, where the identification information is used to identify the apparatus; and decode the polar code based on the fixed bits that carry the identification information. In this way, a length of bits that can carry the identification information can be extended, a length of the identification information that can be represented by the bits can be increased without bringing any other overheads, and a quantity of terminals that can be identified by the identification information can be increased accordingly. This provides support for meeting requirements of a future massive access application scenario.

In one embodiment, the processor 1402 is further configured to: scramble a part or all of the identification information into the fixed bits; or place a part or all of the identification information into the locations of the fixed bits when the locations of the fixed bits are idle. In this way, the identification information is directly used as fixed bits, so that the fixed bits can play an original error correction function, and the locations of the fixed bits can be used to carry the identification information.

In one embodiment, the processor 1402 is further configured to: repeat a part or all of the identification information at least one time and sequentially scramble the repeated identification information into the fixed bits; or when the locations of the fixed bits are idle, repeat a part or all of the identification information at least one time and sequentially place the repeated identification information into the locations of the fixed bits.

In one embodiment, the identification information is an RNTI, or a sequence number of a terminal, or a group number of a terminal group. The identification information may alternatively be a function of the RNTI/the sequence number/the group number of the terminal group, or a function of a subset of the RNTI/the sequence number/the group number of the terminal group. The function may be encoding, such as linear encoding, of all or a part of the RNTI/the sequence number/the group number of the terminal group. Alternatively, the identification information may be a pseudorandom number related to all or a part of the RNTI/the sequence number/the group number of the terminal group. For example, the RNTI may be used as a seed or an initial value to generate various random sequences.

Figure 15:
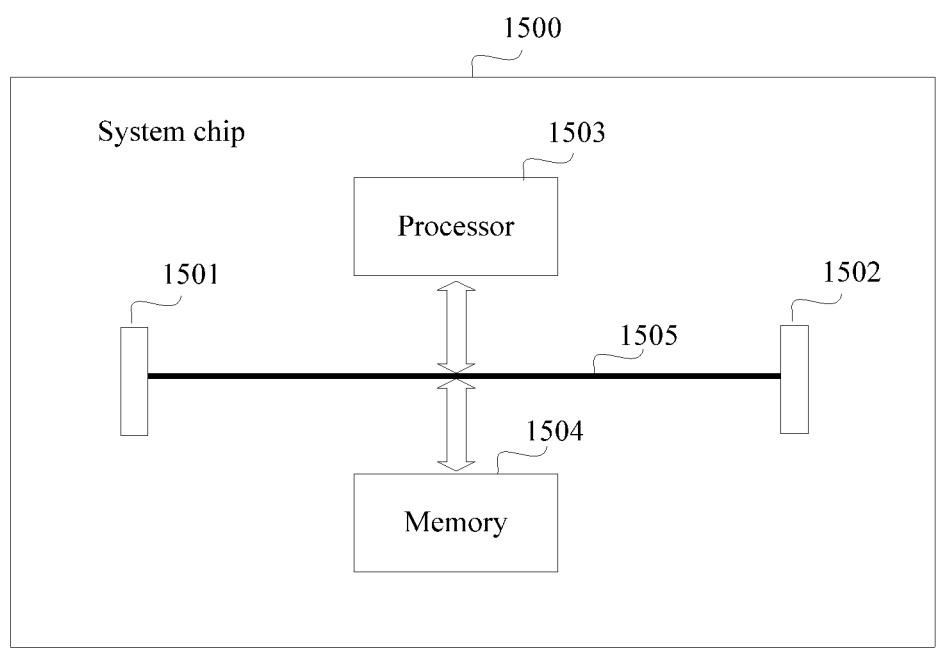
FIG. 15 is a schematic structural diagram 1 of a system chip according to an embodiment of this application.

As shown in FIG. 15, an embodiment of this application further provides a system chip 1500. The system chip 1500 includes an input interface 1501, an output interface 1502, at least one processor 1503, and a memory 1504. In one embodiment, the processor 1503 and the memory 1504 are connected to each other by using a bus 1505. The processor 1503 is configured to execute code in the memory 1504, and when the code is executed, the processor 1503 implements the method performed by the base station in FIG. 4.

The system chip 1500 shown in FIG. 15 can implement the processes implemented by the base station in the foregoing method embodiment in FIG. 4. To avoid repetition, details are not described herein again.

Figure 16:
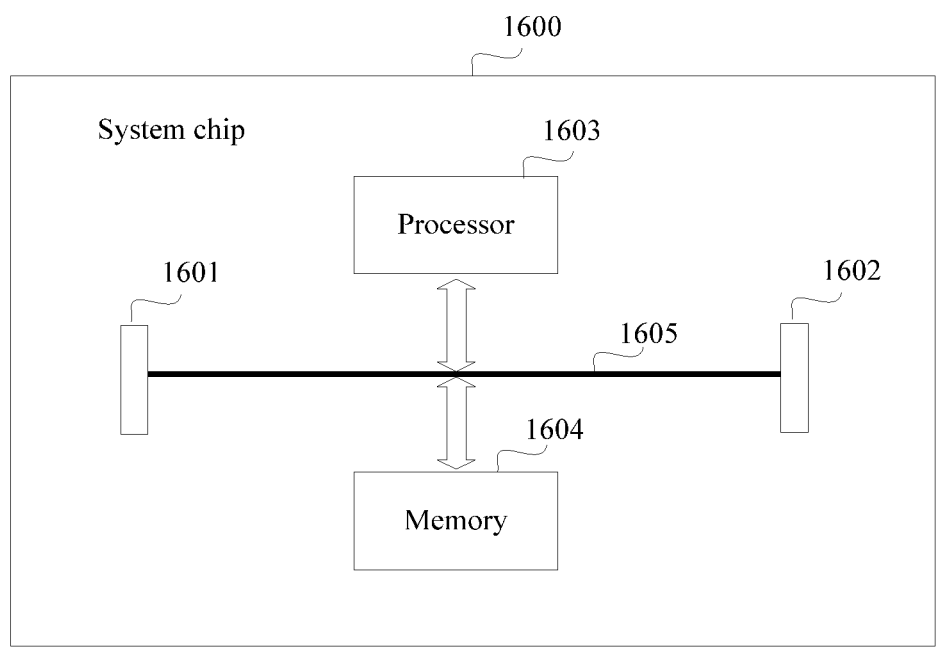
FIG. 16 is a schematic structural diagram 2 of a system chip according to an embodiment of this application.

As shown in FIG. 16, an embodiment of this application further provides a system chip 1600. The system chip 1600 includes an input interface 1601, an output interface 1602, at least one processor 1603, and a memory 1604. In one embodiment, the processor 1603 and the memory 1604 are connected to each other by using a bus 1605. The processor 1603 is configured to execute code in the memory 1604, and when the code is executed, the processor 1603 implements the method performed by the terminal in FIG. 5.

The system chip 1600 shown in FIG. 16 can implement the processes implemented by the terminal in the foregoing method embodiment in FIG. 5. To avoid repetition, details are not described herein again.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage medium (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provides operations for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A method for indicating identification information, comprising:
    determining, by a base station, bit locations that will indicate identification information in to-be-coded bits, wherein the bit locations that will indicate the identification information comprise locations of fixed bits, the identification information is used to identify a terminal, and the fixed bits are used by the terminal to perform error correction in a decoding process;
    adding, by the base station, the identification information to the bit locations based on whether the bit locations are idle; and
    encoding, by the base station, in a polar code encoding mode, the to-be-coded bits that will indicate the identification information, and sending an encoded polar code to the terminal.

2. The method according to claim 1, wherein the adding, by the base station, the identification information to the bit locations comprises:
    placing the identification information into the bit locations when the bit locations are idle; or
    adding the identification information to the bit locations in a scrambling manner when the bit locations are not idle.

3. The method according to claim 1, wherein the to-be-coded bits comprise information bits, and the information bits comprise source information bits and cyclic redundancy check (CRC) information bits corresponding to the source information bits; and
    the bit locations further comprise locations of the CRC information bits.

4. The method according to claim 1, wherein the adding, by the base station, the identification information to the bit locations based on whether the bit locations are idle comprises:
    scrambling, by the base station, a first part of the identification information into the CRC information bits and scrambling a second part of the identification information into the fixed bits or placing the second part into the locations of the fixed bits when the locations of the fixed bits are idle, wherein the first part is different from the second part, or there is an intersection between the first part and the second part; or
    scrambling, by the base station, all the identification information into the fixed bits, or placing all the identification information into the locations of the fixed bits when the locations of the fixed bits are idle; or
    scrambling, by the base station, a first part of the identification information into the CRC information bits and repeating a second part of the identification information at least one time and sequentially scrambling the repeated second parts into the fixed bits or when the locations of the fixed bits are idle, repeating the second part at least one time and sequentially placing the repeated second parts into the locations of the fixed bits, wherein the first part is different from the second part, or there is an intersection between the first part and the second part; or
    repeating, by the base station, a part or all of the identification information at least one time and adding the repeated identification information to the locations of the fixed bits, wherein a quantity of times of repeating the identification information successively increases in descending order of reliability of the locations of the fixed bits.

5. The method according to claim 1, wherein the adding, by the base station, the identification information to the bit locations comprises:
    performing, by the base station, ranking based on reliability of the bit locations, and sequentially selecting high-reliability bit locations from the bit locations to indicate the identification information.

6. A method for indicating identification information, comprising:
    receiving, by a terminal, an encoded polar code sent by a base station, and determining locations of fixed bits in the polar code;
    adding, by the terminal, a part or all of identification information to the locations of the fixed bits, wherein the identification information is used to identify the terminal; and
    decoding, by the terminal, the polar code based on the fixed bits that indicate the identification information.

7. The method according to claim 6, wherein the adding, by the terminal, a part or all of identification information to the locations of the fixed bits comprises:
    scrambling, by the terminal, a part or all of the identification information into the fixed bits; or
    placing a part or all of the identification information into the locations of the fixed bits when the locations of the fixed bits are idle.

8. The method according to claim 6, wherein the encoded polar code comprises information bits, and the information bits comprise source information bits and cyclic redundancy check (CRC) information bits corresponding to the source information bits.

9. The method according to claim 6, wherein the adding, by the terminal, a part or all of the identification information to the locations of the fixed bits comprises:
    scrambling, by the terminal, a first part of the identification information into the CRC information bits and scrambling, a second part of the identification information into the fixed bits or placing the second part into the locations of the fixed bits when the locations of the fixed bits are idle, wherein the first part is different from the second part, or there is an intersection between the first part and the second part; or scrambling, by the terminal, all the identification information into the fixed bits, or placing all the identification information into the locations of the fixed bits when the locations of the fixed bits are idle; or scrambling, by the terminal, a first part of the identification information into the CRC information bits and repeating a second part of the identification information at least one time and sequentially scrambling the repeated second parts into the fixed bits or when the locations of the fixed bits are idle, repeating the second part at least one time and sequentially placing the repeated second parts into the locations of the fixed bits, wherein the first part is different from the second part, or there is an intersection between the first part and the second part; or repeating, by the terminal, a part or all of the identification information at least one time and adding the repeated identification information to the locations of the fixed bits, wherein a quantity of times of repeating the identification information successively increases in descending order of reliability of the locations of the fixed bits; or repeating, by the terminal, a part or all of the identification information at least one time and sequentially scrambling the repeated identification information into the fixed bits; or when the locations of the fixed bits are idle, repeating a part or all of the identification information at least one time and sequentially placing the repeated identification information into the locations of the fixed bits.

10. An apparatus for indicating identification information, comprising a transceiver, a processor, and a memory, wherein both the transceiver and the memory are connected to the processor, the memory stores a set of programs, which when executed by the processor cause the processor to perform operations, the operations comprising:
    determining bit locations that will indicate identification information in to-be-coded bits, wherein the bit locations that will indicate the identification information comprise locations of fixed bits, the identification information is used to identify a terminal, and the fixed bits are used by the terminal to perform error correction in a decoding process;
    adding the identification information to the bit locations based on whether the bit locations are idle; and
    encoding, in a polar code encoding mode, the to-be-coded bits that indicated the identification information, and sending an encoded polar code to the terminal.

11. The apparatus according to claim 10, wherein the adding the identification information to the bit locations comprises:
    placing the identification information into the bit locations when the bit locations are idle; or
    adding the identification information to the bit locations in a scrambling manner when the bit locations are not idle.

12. The apparatus according to claim 10, wherein the to-be-coded bits comprise information bits, and the information bits comprise source information bits and cyclic redundancy check (CRC) information bits corresponding to the source information bits; and
    the bit locations further comprise locations of the CRC information bits.

13. The apparatus according to claim 10, wherein the adding the identification information to the bit locations based on whether the bit locations are idle comprises:

scrambling a first part of the identification information into the CRC information bits and scrambling a second part of the identification information into the fixed bits or placing the second part into the locations of the fixed bits when the locations of the fixed bits are idle, wherein the first part is different from the second part, or there is an intersection between the first part and the second part; or scrambling all the identification information into the fixed bits, or placing all the identification information into the locations of the fixed bits when the locations of the fixed bits are idle; or scrambling a first part of the identification information into the CRC information bits and repeating a second part of the identification information at least one time and sequentially scrambling the repeated second parts into the fixed bits or when the locations of the fixed bits are idle, repeating the second part at least one time and sequentially placing the repeated second parts into the locations of the fixed bits, wherein the first part is different from the second part, or there is an intersection between the first part and the second part; or repeating a part or all of the identification information at least one time and adding the repeated identification information to the locations of the fixed bits, wherein a quantity of times of repeating the identification information successively increases in descending order of reliability of the locations of the fixed bits.

14. The apparatus according to claim 10, wherein the adding the identification information to the bit locations comprises:
    performing ranking based on reliability of the bit locations, and sequentially selecting high-reliability bit locations from the bit locations to indicated the identification information.

15. An apparatus for indicating identification information, comprising a transceiver, a processor, and a memory, wherein both the transceiver and the memory are connected to the processor, the memory stores a set of programs, which when executed by the processor cause the processor to perform operations, the operations comprising:
    receiving an encoded polar code sent by a base station, and determining locations of fixed bits in the polar code;
    adding a part or all of identification information to the locations of the fixed bits, wherein the identification information is used to identify a terminal; and
    decoding the polar code based on the fixed bits that indicate the identification information.

16. The apparatus according to claim 15, wherein the adding a part or all of identification information to the locations of the fixed bits comprises:
    scrambling a part or all of the identification information into the fixed bits; or
    placing a part or all of the identification information into the locations of the fixed bits when the locations of the fixed bits are idle.

17. The apparatus according to claim 15, wherein the encoded polar code comprises information bits, and the information bits comprise source information bits and cyclic redundancy check (CRC) information bits corresponding to the source information bits.

18. The apparatus according to claim 15, wherein the adding a part or all of the identification information to the locations of the fixed bits comprises:
    scrambling a first part of the identification information into the CRC information bits and scrambling, a second part of the identification information into the fixed bits or placing the second part into the locations of the fixed bits when the locations of the fixed bits are idle, wherein the first part is different from the second part, or there is an intersection between the first part and the second part; or scrambling all the identification information into the fixed bits, or placing all the identification information into the locations of the fixed bits when the locations of the fixed bits are idle; or scrambling a first part of the identification information into the CRC information bits and repeating a second part of the identification information at least one time and sequentially scrambling the repeated second parts into the fixed bits or when the locations of the fixed bits are idle, repeating the second part at least one time and sequentially placing the repeated second parts into the locations of the fixed bits, wherein the first part is different from the second part, or there is an intersection between the first part and the second part; or repeating a part or all of the identification information at least one time and adding the repeated identification information to the locations of the fixed bits, wherein a quantity of times of repeating the identification information successively increases in descending order of reliability of the locations of the fixed bits; or repeating a part or all of the identification information at least one time and sequentially scrambling the repeated identification information into the fixed bits; or when the locations of the fixed bits are idle, repeating a part or all of the identification information at least one time and sequentially placing the repeated identification information into the locations of the fixed bits.

19. The apparatus according claim 15, wherein the identification information is a radio network temporary identifier (RNTI).

20. The apparatus according to claim 15, wherein the identification information is a sequence number of the terminal or a group number of a terminal group.

* * * * *